(12) United States Patent  
Tokita et al.

(10) Patent No.: US 11,701,803 B2
(45) Date of Patent: Jul. 18, 2023

(54) POLYCARBONATE SHEET PRESS-FORMED BODY PRODUCTION METHOD

(71) Applicants: MITSUBISHI GAS CHEMICAL COMPANY, INC., Tokyo (JP); MGC FILSHEET CO., LTD., Saitama (JP)

(72) Inventors: Atsuhiro Tokita, Osaka (JP); Masato Takasaki, Osaka (JP)

(73) Assignees: MITSUBISHI GAS CHEMICAL COMPANY, INC., Tokyo (JP); MGC FILSHEET CO., LTD., Saitama (JP)

( * ) Notice: Subject to any disclaimer, the term of this patent is extended or adjusted under 35 U.S.C. 154(b) by 232 days.

(21) Appl. No.: 17/283,100

(22) PCT Filed: Oct. 3, 2019

(86) PCT No.: PCT/JP2019/039082
§ 371 (c)(1),
(2) Date: Apr. 6, 2021

(87) PCT Pub. No.: WO2020/075619
PCT Pub. Date: Apr. 16, 2020

(65) Prior Publication Data
US 2021/0339436 A1     Nov. 4, 2021

(30) Foreign Application Priority Data
Oct. 11, 2018    (JP) ................................. 2018-192739

(51) Int. Cl.
*B29C 43/00*     (2006.01)
*B29C 43/36*     (2006.01)
(Continued)

(52) U.S. Cl.
CPC ............ *B29C 43/003* (2013.01); *B29C 43/36* (2013.01); *B29C 43/52* (2013.01);
(Continued)

(58) Field of Classification Search
None
See application file for complete search history.

(56) References Cited

U.S. PATENT DOCUMENTS

2009/0252935 A1    10/2009  Koyama et al.
2017/0036376 A1    2/2017   Kurokawa et al.

FOREIGN PATENT DOCUMENTS

JP       04-040183 B2     7/1992
JP      2001-334609 A    12/2001
(Continued)

OTHER PUBLICATIONS

International Search Report issued in International Patent Application No. PCT/JP2019/039082, dated Nov. 12, 2019, along with an English translation thereof.
(Continued)

*Primary Examiner* — Robert J Grun
(74) *Attorney, Agent, or Firm* — Greenblum & Bernstein, P.L.C.

(57) ABSTRACT

A method for producing a press-molded body of a polycarbonate sheet including resin layers (A) and (B) respectively containing a polycarbonate resin, and a high hardness resin (B) and a hard coat layer (C) sequentially stacked on at least one surface of the resin layer (A). The method includes pre-heating the polycarbonate sheet to a temperature between a glass transition point of the resin layer (A)−45° C. or higher and the glass transition point or lower; locating the pre-heated polycarbonate sheet between an upper and lower die of a mold, wherein a time period after the pre-heating is finished until the polycarbonate sheet is located between the upper and lower die of the mold is 90 seconds or shorter; and clamping the mold to press the upper and lower die to obtain the press-molded body of the polycarbonate sheet.

9 Claims, 2 Drawing Sheets

(51) Int. Cl.
*B29C 43/52* (2006.01)
*B29K 25/00* (2006.01)
*B29K 33/00* (2006.01)
*B29K 69/00* (2006.01)

(52) U.S. Cl.
CPC .. *B29C 2043/3602* (2013.01); *B29K 2025/08* (2013.01); *B29K 2033/08* (2013.01); *B29K 2069/00* (2013.01)

(56) References Cited

FOREIGN PATENT DOCUMENTS

| | | |
|---|---|---|
| JP | 2002-069210 A | 3/2002 |
| JP | 2009-196153 A | 9/2009 |
| JP | 2009-234184 A | 10/2009 |
| JP | 2010-284910 A | 12/2010 |
| JP | 2014-000688 A | 1/2014 |
| JP | 2018-103518 A | 7/2018 |
| TW | 201431683 A | 8/2014 |
| WO | 2015/159813 A1 | 10/2015 |

OTHER PUBLICATIONS

Written Opinion of the International Searching Authority issued in International Patent Application No. PCT/JP2019/039082, dated Nov. 12, 2019, along with an English translation thereof.
Office Action issued in corresponding Chinese Patent Application No. 201980066016.3 dated Aug. 1, 2022, along with partial English translation thereof.

POLYCARBONATE SHEET PRESS-FORMED BODY PRODUCTION METHOD

TECHNICAL FIELD

The present invention relates to a method for producing a press-molded body of a polycarbonate sheet.

BACKGROUND ART

Many resin molded bodies are used for exterior and interior components of automobiles, aircrafts and the like, electric and electronic devices, consumer electronics, and the like. For example, glass plates, transparent resin plates and the like are used for interior components of automobiles such as meter covers and the like and for components of display surfaces of consumer electronics, office electronics, personal computers, compact mobile devices and the like. Molded bodies formed of a resin (resin molded bodies) are used for frames that hold these glass plates, transparent resin plates and the like. A component of a touch panel display surface used for mobile phone terminals and the like includes a frame formed of an injection-molded resin body (resin molded body), a transparent sheet, especially a glass plate, bonded to the frame with a two-sided adhesive tape, and a resin molded body stacked thereon. For a resin molded body to be used for a display surface of a touch panel, a resin material having a high elasticity is selected from the point of view of the thinness, strength, anti-abrasion property and ease of wiping off fingerprints.

A resin molded body for the above-described uses may be produced by molding a resin sheet. Various measures are taken in order to provide characteristics suitable to each of the uses. For example, a resin sheet is decorated with a hard coat layer, a decorative sheet or the like; resin layers having different compositions are stacked to produce a resin sheet; or a specific composition is used for the resin to be used.

For a decorative sheet, an acrylic resin, for example, is used. A decorative sheet including a hard coat layer provided on a top surface or a bottom surface of an acrylic resin layer, a decorative sheet including a design provided by printing or the like on an acrylic resin layer and also including a film bonded thereto, and the like are used.

For example, Patent Document 1 discloses a decorative sheet including a transparent acrylic resin sheet layer, a design-printed ink layer, an ABS resin sheet layer and an ABS resin backing layer stacked sequentially from the side of a surface thereof. Patent Document 2 discloses a multi-layer film including a polycarbonate resin layer and a layer formed of a methacrylic resin and acrylic rubber particles stacked on a surface of the polycarbonate resin layer. One of surfaces of the multi-layer film is decorated. A decorative sheet including a thermoplastic resin sheet stacked on a decorated surface thereof is disclosed. A decorated molded product produced by injection-molding a thermoplastic resin onto the decorated surface is also disclosed.

Patent Document 3 discloses a resin molded body molded by use of a sheet including a resin base material and a thermosetting or UV-curable hard coat layer provided on the resin base material.

Patent Document 4 discloses a hard coat film for decoration including a base material film and a layer formed on one surface of the base material film by use of a hard coat having a specific composition. It is also described that a printing layer may be provided on the base material film. The decorative film may be heat-molded. The decorative film described in Patent Document 4 is integrated with a resin for molding and is provided as a decorated molded product.

Patent Document 5 discloses a stacked sheet including a base material layer containing a polycarbonate-based resin composition as a main component and a covering layer containing an acrylic resin as a main component and provided on one surface of the base material layer.

As described above, various resin sheets or films for molding have been proposed. It is a never-ending object to pursue a resin sheet or film usable to produce a resin molded body having characteristics more suitable to a specific use.

Conventionally, in the case where different types of resin layers are stacked on each other and a hard coat layer is provided thereon, there is a problem that the resins contained in the layers are different in the glass transition point (Tg) and the melting viscosity and therefore, it is difficult to perform heat molding so as not to cause an inconvenience such as cracking or the like.

Patent Document 6 discloses a method for producing a hard coat sheet bent two-dimensionally. According to the method disclosed in this publication, the difference in the Tg between the stacked resin layers and the processing temperature of the two-dimensional bending are adjusted to perform the two-dimensional bending.

CITATION LIST

Patent Literature

Patent Document 1: Japanese Laid-Open Patent Publication No. 2001-334609
Patent Document 2: Japanese Laid-Open Patent Publication No. 2009-234184
Patent Document 3: Japanese Patent Publication for Opposition No. Hei 4-40183
Patent Document 4: Japanese Laid-Open Patent Publication No. 2010-284910
Patent Document 5: Japanese Laid-Open Patent Publication No. 2009-196153
Patent Document 6: Japanese Laid-Open Patent Publication No. 2014-000688

SUMMARY OF INVENTION

Technical Problem

Despite the recent advancements, a novel method for producing a press-molded body of a polycarbonate sheet is still demanded.

The present invention is, for example, as follows.

[1] A method for producing a press-molded body of a polycarbonate sheet including a resin layer (A) containing a polycarbonate resin as a main component, and a resin layer (B) containing a high hardness resin (B) as a main component and a hard coat layer (C) sequentially stacked on at least one surface of the resin layer (A), the method including:

step (I) of pre-heating the polycarbonate sheet to a temperature in the range of a glass transition point of the resin layer (A)−45° C. or higher and the glass transition point or lower;

step (II) of locating the pre-heated polycarbonate sheet between an upper die and a lower die of a metal mold, wherein a time period after the step (I) is finished until the polycarbonate sheet is located between the upper die and the lower die of the mold is 90 seconds or shorter; and step (III) of clamping the mold to press one of the upper die and the lower die to the other of the upper die and the lower die to obtain the press-molded body of the polycarbonate sheet, wherein the mold has a temperature that is the glass transition point of the resin layer (A) or lower.

[2] The method according to [1], wherein in the step (II), the time period after the step (I) is finished until the polycarbonate sheet is located between the upper die and the lower die of the mold is 60 seconds or shorter.

[3] The method according to [1] or [2], wherein in the step (III), the mold has a temperature that is in the range of the glass transition point of the resin layer (A)−10° C. or higher and the glass transition point or lower.

[4] The method according to any one of [1] through [3], wherein in the step (III), the mold is clamped by a clamping force of 2000 kgf or smaller.

[5] The method according to any one of [1] through [4], wherein the polycarbonate sheet has a pencil hardness of 2H or higher.

[6] The method according to any one of [1] through [5], wherein the high hardness resin (B) contains at least one selected from resins (B1) through (B5), wherein:

the resin (B1) is a resin that contains a copolymer containing:

a (meth)acrylic ester structural unit (a) represented by the following general formula (1):

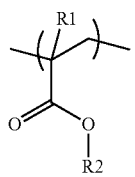

(1)

(in the formula (1), R1 is a hydrogen atom or a methyl group; and R2 is an alkyl group having a carbon number of 1 to 18 or a cycloalkyl group having a carbon number of 5 to 18 that may be substituted with a hydrocarbon group having a carbon number of 1 to 4), and an aliphatic vinyl structural unit (b) represented by the following general formula (2):

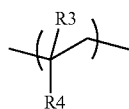

(1)

(in the formula (2), R3 is a hydrogen atom or a methyl group; and R4 is a cyclohexyl group that may be substituted with a hydrocarbon group having a carbon number of 1 to 4);

the resin (B2) is a resin that contains a copolymer (D) containing 6 to 77% by mass of a (meth)acrylic ester structural unit, 15 to 71% by mass of a styrene structural unit, and 5 to 25% by mass of an unsaturated dicarboxylic acid structural unit;

the resin (B3) is a resin that contains a copolymer containing a structural unit (c) represented by the following general formula (6) and optionally containing a structural unit (d) represented by the following general formula (7);

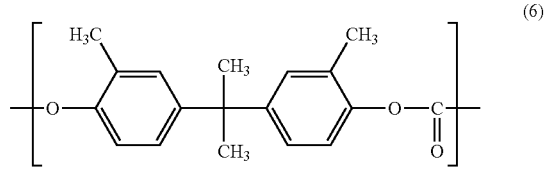

(6)

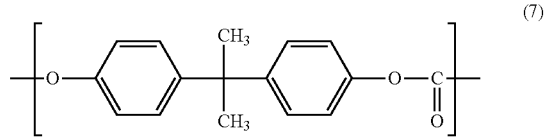

(7)

the resin (B4) is a resin that contains a copolymer (G) containing 5 to 20% by mass of a styrene structural unit, 60 to 90% by mass of a (meth)acrylic ester structural unit, and 5 to 20% by mass of an N-substituted maleimide structural unit; and the resin (B5) is a resin that contains a polymer containing a structural unit (e) represented by the following general formula (8), optionally containing the structural unit (c) represented by the above-identified general formula (6) and optionally containing the structural unit (d) represented by the above-identified general formula (7).

(8)

[7] The method according to any one of [1] through [6], wherein the polycarbonate resin contains a structural unit represented by general formula (7), and (7)

is produced by use of, as a chain terminator, a monovalent phenol represented by general formula (5):

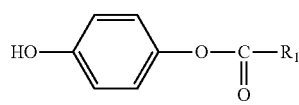

(5)

(in the formula, $R_1$ represents an alkyl group having a carbon number of 8 to 36 or an alkenyl group having a carbon number of 8 to 36).

[8] The method according to any one of [1] through [7], wherein the glass transition point of the resin layer (A) and a glass transition point of the resin layer (B) fulfill the following relationship:

−10° C.≤(glass transition point of the resin layer (B))−(glass transition point of the resin layer (A))≤40° C.

[9] The method according to any one of [1] through [8], wherein the press-molded body is a component or a part for use in an automobile, an electric and electronic device, a consumer electronic device or an aircraft.

According to the present invention, a novel method for producing a press-molded body of a polycarbonate sheet is provided.

According to one embodiment of the present invention, a resin molded body that has a high hardness and does not easily cause hard coat cracks or breakage of the sheet when being molded may be provided.

According to a preferred embodiment of the present invention, a resin molded body causing little springback when being molded may be provided.

According to a preferred embodiment of the present invention, a resin molded body suppressing the surface from having protrusions and recesses as a result of being crumpled when being molded may be provided.

According to a preferred embodiment of the present invention, a heat-press-molded body produced by use of a mold having various shapes of curved surface as well as a two-dimensional bending mold may be provided.

DESCRIPTION OF EMBODIMENTS

Figure 1:
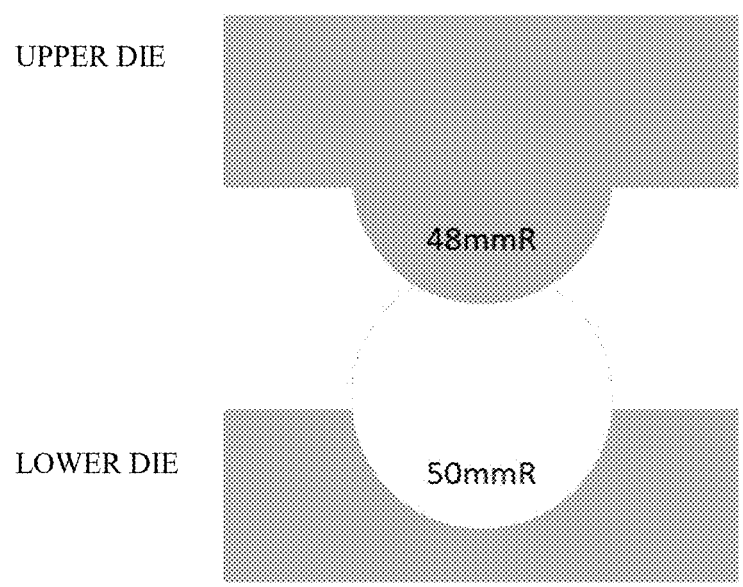
FIG. 1 is a schematic view showing a cross-section of a mold (two-dimensional (tunnel-shaped)) used for a heat pressing step in examples and comparative examples.

Hereinafter, production examples, examples and the like according to the present invention will be described in detail. The present invention is not limited to any of the production examples, examples or the like illustrated herein, and may be altered to any method without significantly departing from the gist of the present invention.

One embodiment of the present invention is directed to a method for producing a press-molded body of a polycarbonate sheet including a resin layer (A) containing a polycarbonate resin as a main component, and a resin layer (B) containing a high hardness resin (B) as a main component and a hard coat layer (C) sequentially stacked on at least one surface of the resin layer (A). The production method includes the following steps (I) through (III).

Step (I): a step of pre-heating the polycarbonate sheet to a temperature in the range of a glass transition point of the resin layer (A)−45° C. or higher and the glass transition point or lower;

Step (II): a step of locating the pre-heated polycarbonate sheet between an upper die and a lower die of a metal mold, wherein a time period after the step (I) is finished until the polycarbonate sheet is located between the upper die and the lower die of the mold is 90 seconds or shorter; and Step (III): a step of clamping the mold to press one of the upper die and the lower die to the other of the upper die and the lower die to obtain the press-molded body of the polycarbonate sheet, wherein the mold has a temperature that is the glass transition point of the resin layer (A) or lower.

The present inventors made active studies on a method for producing a press-molded body of a polycarbonate sheet (resin sheet for molding) that contains polycarbonate resin as a base material, includes a hard coat layer provided at a surface thereof, and has a high hardness. As a result, the present inventors have found that in the case where a polycarbonate sheet to be used for molding is structured as a predetermined stacked body (resin layer (A), resin layer (B) and hard coat layer (C)) and is molded by a predetermined press-molding method, a molded body that is not easily broken even in the form of a hard sheet, suppresses generation of cracks when being molded, and does not easily cause abnormalities in the external appearance may be provided. In addition, according to the production method in an embodiment, it is possible to use molds having various shapes of curved surface (e.g., two-dimensional-shape molds (e.g., tunnel-shaped molds of a 2 mm-thick sheet having a radius of curvature of 70 mm or less, furthermore 50 mm or less), semispherical molds, three-dimensional molds having a radius of curvature of about 100 mmR or greater), which are difficult to be used with a conventional method for heat-molding a resin stacked body including a hard coat layer. The present inventors have found that use of such molds provides heat-press-molded bodies of various shapes (e.g., three-dimensional shapes).

Hereinafter, a polycarbonate sheet usable for press molding and a press molding method in an embodiment will be described.

1. Polycarbonate Sheet

A polycarbonate sheet for molding (hereinafter, also referred to simply as the "resin sheet") to be used for molding according to the present invention includes a resin layer (A) containing a polycarbonate resin (a1) as a main component, a resin layer (B) located on at least one of surfaces of the resin layer (A) and containing a high hardness resin (B) as a main component, and a hard coat layer (C). The resin layer (B) is located between the resin layer (A) and the hard coat layer (C). A further layer may be present between the resin layer (A) and the resin layer (B) and between the resin layer (B) and the hard coat layer (C). Examples of the further layer include an adhesive layer, a primer layer and the like, but are not limited thereto. The further layer does not need to be present. In one embodiment, the resin sheet includes a resin layer (A) containing a polycarbonate resin (a1) as a main component, a resin layer (B) stacked immediately on at least one of surfaces of the resin layer (A), and a hard coat layer (C) stacked immediately on the resin layer (B).

It is sufficient that the resin layer (B) and the hard coat layer (C) are provided on at least one side of the resin layer (A), and there is no specific limitation on the structure of the other side. The resin layer (B) may be provided on each of both sides of the resin layer (A). In this case, the hard coat layer (C) may be provided on one of, or each of both of, the resin layers (B). In the case where the resin layer (B) is provided on each of the both sides of the resin layer (A), use of the same high hardness resin (B) for the two resin layers (B) is desired in order to obtain a less-warped and stable resin sheet suitable for heat press molding.

Next, each of elements of the polycarbonate sheet (resin sheet) will be described.

2. Resin Layer (A)

The resin layer (A) acts as a base material of the polycarbonate sheet, and contains a polycarbonate resin (a1) as a main component. The polycarbonate resin (a1) contained in the resin layer (A) may be of one type or two or more types. Herein, the expression "containing a polycarbonate resin (a1) as a main component" refers to that, for example, the content of the polycarbonate resin (a1) in the resin layer (A) is 50% by mass or higher with respect to the entire mass of the resin layer (A). The content of the polycarbonate resin (a1) in the resin layer (A) is preferably 75% by mass or higher, more preferably 90% by mass or higher, and especially preferably 100% by mass. An increase in the content of the polycarbonate resin improves the impact resistance.

The polycarbonate resin (a1) may be any resin that contains a unit containing a carbonate ester bond in a molecular backbone, namely, a —[O—R—OCO]-unit (herein, R may contain an aliphatic group, an aromatic group, or both of an aliphatic group and an aromatic group, and may have a straight chain structure or a branched chain structure), with no specific limitation. The polycarbonate resin (a1) is, among various resins, preferably an aromatic polycarbonate resin, more preferably an aromatic polycarbonate resin obtained by use of an aromatic dihydroxy compound, and especially preferably a polycarbonate resin containing a structural unit of the following formula (7). Use of such a polycarbonate resin may provide a resin sheet having a better impact resistance.

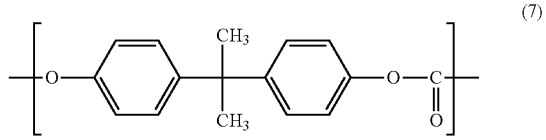

Specific preferred examples of the polycarbonate resin (a1) include an aromatic polycarbonate resin (e.g., Iupilon S-2000, Iupilon S-1000 or Iupilon E-2000 produced by Mitsubishi Engineering-Plastics Corporation) and the like. These polycarbonate-based resins may be used independently or as a combination of two or more thereof.

For the purpose of controlling the glass transition point of the polycarbonate resin, a polycarbonate resin containing a monovalent phenol represented by the following general formula (4) as a chain terminator is generally used. Specifically, such a polycarbonate resins contains a structural unit represented by the above-identified formula (7) and is produced by use of a monovalent phenol represented by general formula (4) as a chain terminator. In the present invention also, a polycarbonate resin containing such a chain terminator is usable.

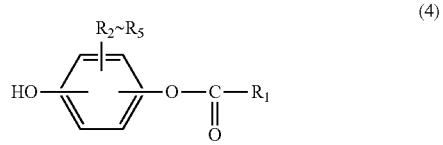

(In the formula, $R_1$ represents an alkyl group having a carbon number of 8 to 36 or an alkenyl group having a carbon number of 8 to 36; and $R_2$ through $R_5$ independently represent a hydrogen atom, halogen, or an alkyl group having a carbon number of 1 to 20 or an aryl group having a carbon number of 6 to 12 that may contain a substituent; herein, the substituent is halogen, an alkyl group having a carbon number of 1 to 20, or an aryl group having a carbon number of 6 to 12.)

In this specification, the "alkyl group" and the "alkenyl group" may have a straight chain structure or a branched chain structure, and may contain a substituent.

More preferably, the monovalent phenol represented by general formula (4) is represented by the following general formula (5).

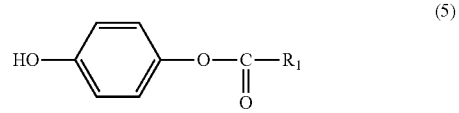

(In the formula, $R_1$ represents an alkyl group having a carbon number of 8 to 36 or an alkenyl group having a carbon number of 8 to 36.)

More preferably, the carbon number of $R_1$ in general formula (4) or general formula (5) is in a specific numerical range. Specifically, the upper limit of the carbon number of $R_1$ is preferably 30, more preferably 22, and especially preferably 18. The lower limit of the carbon number of $R_1$ is preferably 10, and more preferably 12.

In the case where the carbon number of $R_1$ in general formula (4) or general formula (5) is in the above range, the monovalent phenol is highly productive (highly economical), suppresses an increase in the glass transition point of the polycarbonate resin, and is highly heat-moldable.

Among monovalent phenols represented by general formula (4) or general formula (5), it is especially preferred to use, as a chain terminator, either one of, or both of, hexadecylester parahydroxybenzoate and 2-hexyldecylester parahydroxybenzoate.

It is especially preferred to use, for example, a monovalent phenol represented by general formula (5) in which $R_1$ is an alkyl group having a carbon number of 16 as a chain terminator because in this case, a polycarbonate resin that is superb in the glass transition temperature, melt fluidity, moldability, drawdown resistance and the like may be obtained.

Examples of the polycarbonate resin using such a monovalent phenol as a chain terminator include Iupizeta T-1380 (produced by Mitsubishi Gas Chemical Company Inc.), and the like.

In the present invention, the weight average molecular weight (Mw) of the polycarbonate resin (a1) may influence the impact resistance and the thermal stability of the resin sheet. From the point of view of the impact resistance and the thermal stability, the weight average molecular weight (Mw) of the polycarbonate resin (a1) is preferably 15,000 to 75,000, more preferably 20,000 to 70,000, and still more preferably 20,000 to 65,000. The weight average molecular weight (Mw) in this specification is the standard polystyrene-converted weight average molecular weight measured by gel permeation chromatography (GPC).

In the present invention, it is preferred that the glass transition point of the resin layer (A) fulfills the following relationship with the glass transition point of the resin layer (B).

−10° C.≤(glass transition point of the resin layer (B))−(glass transition point of the resin layer (A))≤40° C.

Such a relationship is fulfilled, so that a resin sheet for molding that has a high hardness and does not easily cause abnormalities in the external appearance such as cracks, flow marks or the like at the time of molding may be obtained. Especially, abnormalities in the external appearance are not easily caused at the time of heat molding. For such a resin sheet, the conditions for heat molding (temperature, heating time, etc.) may be set to be in a wide range. Therefore, such a resin sheet is considered to be suitable for heat molding.

The glass transition point of the resin layer (A) and the glass transition point of the resin layer (B) preferably fulfill the relationship of −10° C.≤(glass transition point of the resin layer (B))−(glass transition point of the resin layer (A))≤30° C., and more preferably fulfill the relationship of −7° C.≤(glass transition point of the resin layer (B))−(glass transition point of the resin layer (A))≤30° C. If the Tg of the resin layer (B) is significantly lower than the Tg of the resin layer (A), the high hardness resin contained in the resin layer (B) is put into a rubber state or a melted state at the time of heat molding, resulting in becoming easily movable. In such a case, the hard coat layer (C), which has a highly cross-linked structure and remains hard even when being heated, cannot follow the movement of the high hardness resin, which becomes easily movable. As a result, cracks are easily caused. By contrast, if the Tg of the resin layer (B) is significantly higher than the Tg of the resin layer (A), the difference in the viscosity between the high hardness resin contained in the resin layer (B) and the polycarbonate resin contained in the resin layer (A) becomes large. Therefore, the interface between the layers is roughened when the layers are stacked on each other, and as a result, flow marks may be caused.

A person of ordinary skill in the art could consider the glass transition point (Tg) of the high hardness resin to be used, and select and use an appropriate polycarbonate resin (a1) having a Tg that fulfills the above-described relationship from known polycarbonate resins. The Tg of the polycarbonate resin (a1) is preferably 90 to 190° C., more preferably 100 to 170° C., and especially preferably 110 to 150° C.

In this specification, the "glass transition point of the resin layer (A)" refers to the glass transition point of the polycarbonate resin (a1) used as the main component of the resin layer (A). In the case where the resin layer (A) contains two or more types of polycarbonate resins (a1), the glass transition point is that of the polycarbonate resin mixture. The "glass transition point of the resin layer (B)" refers to the glass transition point of the high hardness resin used as the main component of the resin layer (B). In the case where the resin layer (B) contains two or more types of high hardness resins, the glass transition point is that of the high hardness resin mixture. In this specification, the glass transition point is the temperature measured with 10 mg of the sample at a temperature rise rate of 10° C./min. by use of a differential scanning calorimetry device and calculated by a midpoint method.

The resin layer (A) may contain another resin in addition to the polycarbonate resin (a1). Examples of such a resin include a polyester resin and the like. It is preferred that the polyester resin mainly contain terephthalic acid as a dicarboxylic acid component, but the polyester resin may contain a dicarboxylic acid component other than terephthalic acid.

A preferred resin is, for example, a polyester resin (so-called "PETG") obtained by polycondensation of a glycol component containing 20 to 40 mol % of 1,4-cyclohexanedimethanol with respect to 80 to 60 mol % of ethyleneglycol as a main component (100 mol % in total) and a dicarboxylic acid component. It is preferred that the resin layer (A) contains only the polycarbonate resin (a1). In the case where the resin layer (A) contains another resin, the amount thereof with respect to the total mass of the resin layer (A) is preferably 0 to 50% by mass, more preferably 0 to 30% by mass, and especially preferably 0 to 20% by mass.

The resin layer (A) may further contain an additive or the like. An additive usually usable for a resin sheet is usable. Examples of such an additive include an antioxidant, an anti-coloring agent, an antistatic agent, a releasing agent, a lubricant, a dye, a pigment, a plasticizer, a flame retardant, a resin modifier, a compatibilizer, a reinforcing agent such as an organic filler or an inorganic filler, and the like. There is no specific limitation on the method for mixing the additive and the resin. The additive and the resin may be mixed together by a method of compounding the entire amounts, a method of dry-blending the master batches, a method of dry-blending the entire amounts, and the like. The amount of the additive with respect to the total mass of the resin layer (A) is preferably 0 to 10% by mass, more preferably 0 to 7% by mass, and especially preferably 0 to 5% by mass.

The thickness of the resin layer (A) is preferably 0.3 to 10 mm, more preferably 0.3 to 5 mm, and especially preferably 0.3 to 3.5 mm.

3. Resin Layer (B)

The resin layer (B) contains a high hardness resin as a main component. Herein, the expression "containing a high hardness resin as a main component" refers to that the content of the high hardness resin in the resin layer (B) with respect to the total mass of the resin layer (B) is 50% by mass or higher. The content of the high hardness resin in the resin layer (B) is preferably 70 to 100% by mass, more preferably 80 to 100% by mass, and especially preferably 100% by mass.

In this specification, the "high hardness resin" refers to a resin having a pencil hardness of HB or higher. The pencil hardness of the high hardness resin is preferably HB or higher and 3H or lower, and more preferably H or higher and 3H or lower. Herein, the "pencil hardness of the high hardness resin" refers to the following. Pencils are pressed to a surface of a resin layer formed of the high hardness resin at an angle of 45 degrees and a load of 750 g, while the hardness of the pencils is increased. The "pencil hardness of the high hardness resin" refers to the hardness of the hardest pencil among the pencils that did not leave a scratch (scratch hardness test (pencil method) conformed to JIS K 5600-5-4: 1999).

The high hardness resin contained in the resin layer (B) may be of one type or two or more types. It is preferred that the high hardness resin contains, for example, at least one of resins (B1) through (B5) described below.

<Resin (B1)>

The resin (B1) is a resin that contains a copolymer (b1) containing a (meth)acrylic ester structural unit (a) represented by the following general formula (1) and an aliphatic vinyl structural unit (b) represented by the following general formula (2). The resin (B1) may be an alloy of the copolymer (b1) and another polymer, and may be, for example, an alloy of the copolymer (b1) and a copolymer (b2) described in <Resin (B2)> below. The content of the copolymer (b1) with respect to the total mass (100% by mass) of the resin (B1) is preferably 80 to 100% by mass, and more preferably 95 to 100% by mass.

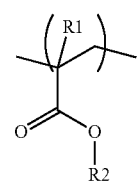

(1)

(In formula (1), R1 is a hydrogen atom or a methyl group; and R2 is an alkyl group having a carbon number of 1 to 18 or a cycloalkyl group having a carbon number of 5 to 18 that may be substituted with a hydrocarbon group having a carbon number of 1 to 4)

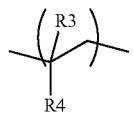

(2)

(In formula (2), R3 is a hydrogen atom or a methyl group; and R4 is a cyclohexyl group that may be substituted with a hydrocarbon group having a carbon number of 1 to 4.)

In this specification, the "hydrocarbon group" may have a straight chain structure, a branched chain structure or a cyclic chain structure, and may contain a substituent.

In this specification, the "cycloalkyl" may be monocyclic or bicyclic.

In the (meth)acrylic ester structural unit (a) represented by general formula (1), R2 is an alkyl group having a carbon number of 1 to 18 or a cycloalkyl group having a carbon number of 5 to 18 that may be substituted with a hydrocarbon group having a carbon number of 1 to 4 (preferably, an alkyl group having a carbon number of 1 to 4). R2 is preferably an alkyl group having a carbon number of 1 to 10, and more preferably an alkyl group having a carbon number of 1 to 6. Specific examples of R2 include a methyl group, an ethyl group, a butyl group, a dodecyl group, an octadecyl group, a cyclohexyl group, an isobornyl group, and the like.

Among various examples of the (meth)acrylic ester structural unit (a), a (meth)acrylic ester structural unit in which R2 is a methyl group or an ethyl group is preferred, and a methyl methacrylate structural unit in which R1 is a methyl group and R2 is a methyl group is more preferred.

In the aliphatic vinyl structural unit (b) represented by general formula (2), R3 is a hydrogen atom or a methyl group, and is more preferably a hydrogen atom. R4 is a cyclohexyl group or a cyclohexyl group substituted with a hydrocarbon group (e.g., methyl group or butyl group) having a carbon number of 1 to 4, and is preferably a cyclohexyl group with no substituent.

Among various examples of the aliphatic vinyl structural unit (b), an aliphatic vinyl structural unit in which R3 is a hydrogen atom and R4 is a cyclohexyl group is more preferred.

The copolymer (b1) may contain one type of, or two or more types of, (meth)acrylic ester structural unit (a), and may contain one type of, or two or more types of, aliphatic vinyl structural unit (b).

The total content of the (meth)acrylic ester structural unit (a) and the aliphatic vinyl structural unit (b) with respect to all the structural units of the copolymer (b1) is preferably 90 to 100 mol %, more preferably 95 to 100 mol %, and especially preferably 98 to 100 mol %.

In other words, the copolymer (b1) may contain a structural unit other than the (meth)acrylic ester structural unit (a) and the aliphatic vinyl structural unit (b). The amount thereof with respect to all the structural units of the resin (B1) is preferably 10 mol % or smaller, more preferably 5 mol % or smaller, and especially preferably 2 mol % or smaller.

Examples of the structural unit other than the (meth) acrylic ester structural unit (a) and the aliphatic vinyl structural unit (b) include a structural unit that is generated during a process of, after a (meth)acrylic ester monomer and an aromatic vinyl monomer are polymerized, hydrogenating an aromatic double bond derived from the aromatic vinyl monomer to produce the copolymer (b1) and that is derived from an aromatic vinyl monomer containing a non-hydrogenated aromatic double bond. One such example is an aromatic vinyl structural unit represented by the following general formula (3).

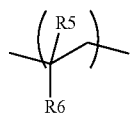

(3)

(In formula (3), R5 is a hydrogen atom or a methyl group; and R6 is a phenyl group, a cyclohexadiene group or a cyclohexene group that may be substituted with a hydrocarbon group (e.g., methyl group or butyl group) having a carbon number of 1 to 4.)

The content of the (meth)acrylic ester structural unit (a) represented by general formula (1) with respect to all the structural units of the resin (B1) is preferably 65 to 80 mol %, and more preferably 70 to 80 mol %. In the case where the content of the (meth)acrylic ester structural unit (a) represented by general formula (1) with respect to all the structural units of the resin (B1) is 65 mol % or higher, a resin layer that is superb in the adhesiveness with the resin layer (A) and the surface hardness may be obtained. In the case where the content of the (meth)acrylic ester structural unit (a) represented by general formula (1) with respect to all the structural units of the resin (B1) is 80 mol % or lower, warp caused by absorption of water by the resin sheet does not easily occur.

The content of the aliphatic vinyl structural unit (b) represented by general formula (2) with respect to all the structural units of the resin (B1) is preferably 20 to 35 mol %, and more preferably 20 to 30 mol %. In the case where the content of the aliphatic vinyl structural unit (b) is 20 mol % or higher, warp in a high-temperature, high humidity environment may be prevented. In the case where the content of the aliphatic vinyl structural unit (b) is 35 mol % or lower, delamination at the interface with the base material may be prevented.

In this specification, the "copolymer" may be any of a random copolymer, a block copolymer and an alternating copolymer.

There is no specific limitation on the method for producing the copolymer (b1). A preferred copolymer (b1) is obtained by polymerizing at least one type of (meth)acrylic ester monomer and at least one type of aromatic vinyl monomer and then hydrogenating an aromatic double bond derived from the aromatic vinyl monomer. The "(meth) acrylic acid" refers to a methacrylic acid and/or an acrylic acid.

Specific examples of the aromatic vinyl monomer usable for the above include styrene, α-methylstyrene, p-hydroxystyrene, alkoxystyrene, chlorostyrene, derivatives thereof, and the like. Among these, styrene is preferred.

The polymerization of the (meth)acrylic ester monomer and the aromatic vinyl monomer may be performed by a known method. For example, bulk polymerization, solution polymerization or the like may be used.

It is preferred that in the copolymer (b1), 70% or higher of the aromatic double bond derived from the aromatic vinyl monomer is hydrogenated. In other words, it is preferred that the ratio of the aromatic double bond, contained in the structural unit derived from the aromatic vinyl monomer, that is not hydrogenated is lower than 30%. Such a ratio is lower than 30%, so that a highly transparent resin may be obtained. The ratio is more preferably lower than 10%, and still more preferably lower than 5%.

There is no specific limitation on the weight average molecular weight (Mw) of the resin (B1). From the point of view of the strength and the moldability, the weight average molecular weight (Mw) of the resin (B1) is preferably 50,000 to 400,000, and more preferably 70,000 to 300,000.

The glass transition point (Tg) of the resin (B1) is preferably in the range of 110 to 140° C., more preferably in the range of 110 to 135° C., and especially preferably in the range of 110 to 130° C. The glass transition point (Tg) is 110° C. or higher, so that the resin sheet provided by the present invention is not often deformed or broken by the thermal environment or the humidity and temperature environment. By contrast, the glass transition point (Tg) is 140° C. or lower, so that the resin is superb in the processability when being molded by continuous thermal shaping by use of a mirror roll or a shaping roll or when being molded by batch thermal shaping by use of a mirror mold or a shaping mold.

Specific examples of the resin (B1) include Optimas 7500 and 6000 (produced by Mitsubishi Gas Chemical Company Inc.).

In the case where the resin (B1) is used as the high hardness resin, it is preferred to use, as the polycarbonate resin (a1), a polycarbonate resin that contains a structural unit represented by the above-identified formula (7) and is produced by use of, as a chain terminator, a monovalent phenol represented by the above-identified general formula (5) (it is preferred to use, for example, Iupizeta T-1380 (produced by Mitsubishi Gas Chemical Company Inc.)). In an especially preferred embodiment, the resin (B1) is a copolymer containing 75 mol % of a structural unit represented by general formula (1) (R1 and R2 are each a methyl group; methyl methacrylate) and 25 mol % of a structural unit represented by general formula (2) (R3 is a hydrogen atom and R4 is a cyclohexyl group), and the polycarbonate resin (a1) contains a structural unit represented by general formula (7) and is produced by use of, as a chain terminator, a monovalent phenol represented by general formula (5) (the carbon number of R1 is 8 to 22).

<Resin (B2)>

The resin (B2) is a resin that contains a copolymer (D) containing 6 to 77% by mass of a (meth)acrylic ester structural unit, 15 to 71% by mass of a styrene structural unit, and 5 to 25% by mass of an unsaturated dicarboxylic acid structural unit. The resin (B) may be an alloy of copolymers (D) or an alloy of a copolymer (D) and a high hardness polymer other than the copolymer (D). Examples of the high hardness polymer other than the copolymer (D) include methyl methacrylate-styrene copolymer, polymethylmethacrylate, acrylonitrile-butadiene-styrene copolymer, and the like. In the case where the resin (B) is an alloy, it is preferred that the resin (B2) is an alloy of polymers having as high a Tg as possible in order to avoid a decrease in the Tg of the high hardness resin.

Examples of the (meth)acrylic ester monomer contained in the (meth)acrylic ester structural unit include acrylic acid, methyl acrylate, ethyl acrylate, n-butyl acrylate, 2-ethylhexyl acrylate, methacrylic acid, methyl methacrylate, ethyl methacrylate, n-butyl methacrylate, 2-ethylhexyl methacrylate, and the like. Methyl methacrylate is especially preferred. These (meth)acrylic ester monomers may be used as a mixture of two or more thereof.

The content of the (meth)acrylic ester structural unit with respect to the entire mass of the copolymer (D) is 6 to 77% by mass, preferably 6 to 70% by mass, and more preferably 20 to 70% by mass.

As the styrene structural unit, any known styrene-based monomer is usable with no specific limitation. From the point of view of the each of availability, styrene, α-methylstyrene, o-methylstyrene, m-methylstyrene, p-methylstyrene, t-butylstyrene and the like are preferred. Among these, styrene is especially preferred from the point of view of the compatibility. These styrene-based monomers may be used as a mixture of two or more thereof.

The content of the styrene structural unit with respect to the entire mass of the copolymer (D) is 15 to 71% by mass, and more preferably 20 to 71% by mass.

Examples of an unsaturated dicarboxylic acid anhydride monomer included in the unsaturated dicarboxylic acid structural unit include acid anhydrides of maleic acid, itaconic acid, citraconic acid, aconitic acid, and the like. From the point of view of the compatibility with the styrene-based monomer, maleic anhydride is preferred. These unsaturated dicarboxylic acid anhydride monomers may be used as a mixture of two or more thereof.

The content of the unsaturated dicarboxylic acid structural unit with respect to the entire mass of the copolymer (D) is 5 to 25% by mass, preferably 6 to 24% by mass, and more preferably 8 to 23% by mass.

The total content of the (meth)acrylic ester structural unit, the styrene structural unit and the unsaturated dicarboxylic acid structural unit with respect to all the structural units of the copolymer (D) is preferably 90 to 100 mol %, more preferably 95 to 100 mol %, and especially preferably 98 to 100 mol %.

In other words, the copolymer (D) may contain a structural unit other than the (meth)acrylic ester structural unit, the styrene structural unit and the unsaturated dicarboxylic acid structural unit. The amount thereof with respect to all the structural units of the copolymer (D) is preferably 10 mol % or smaller, more preferably 5 mol % or smaller, and especially preferably 2 mol % or smaller.

Examples of such other structural unit include N-phenylmaleimide, and the like.

There is no specific limitation on the method for producing the copolymer (D). The copolymer (D) may be produced by, for example, bulk polymerization or solution polymerization.

Specific examples of the resin (B2) include Resisfy R100, 8200 and R310 (produced by Denka Company Limited), Delpet 980N (produced by Asahi Kasei Chemical Corp.), hw55 (produced by Daicel-Evonik, Ltd.), and the like.

There is no specific limitation on the weight average molecular weight (Mw) of the resin (B2). The weight average molecular weight (Mw) is preferably 50,000 to 300,000, and more preferably 80,000 to 200,000.

The glass transition point (Tg) of the resin (B2) is preferably 90 to 150° C., more preferably 100 to 150° C., and especially preferably 115 to 150° C.

In the case where the resin (B2) is used as the high hardness resin, a polycarbonate resin containing a structural unit of general formula (7) is used as the polycarbonate resin (a1) in a preferred embodiment. In an especially preferred embodiment, a polycarbonate resin produced by use of a monovalent phenol represented by general formula (5) (the carbon number of R1 is 8 to 22) as a chain terminator is used. In a preferred embodiment, the resin (B2) is a copolymer (R100, 8200 or 8310 produced by Denka Company Limited) containing 6 to 26% by mass of a methyl methacrylate structural unit, 55 to 71% by mass of a styrene structural unit and 15 to 23% by mass of a maleic anhydride structural unit; and the polycarbonate resin (a1) is a polycarbonate resin (e.g., Iupizeta T-1380) that contains a structural unit represented by the above-identified general formula (7) and is produced by use of a monovalent phenol represented by the above-identified general formula (5) as a chain terminator, or is a polycarbonate resin (e.g., Iupilon S-100) containing a structural unit represented by the above-identified general formula (7). In an especially preferred embodiment, the resin (B2) is a copolymer (R100 produced by Denka Company Limited) containing 21% by mass of a methyl methacrylate structural unit, 64% by mass of styrene and 15% by mass of maleic anhydride, and the polycarbonate resin (a1) is a polycarbonate resin (e.g., Iupizeta T-1380) that contains a structural unit represented by the above-identified general formula (7) and is produced by use of a monovalent phenol represented by the above-identified general formula (5) as a chain terminator.

<Resin (B3)>

The resin (B3) is a resin that contains a copolymer containing a structural unit (c) represented by the following general formula (6) and optionally containing a structural unit (d) represented by the following general formula (7). The resin (B3) may or may not contain the structural unit (d). It is preferred that the resin (B3) contains the structural unit (d).

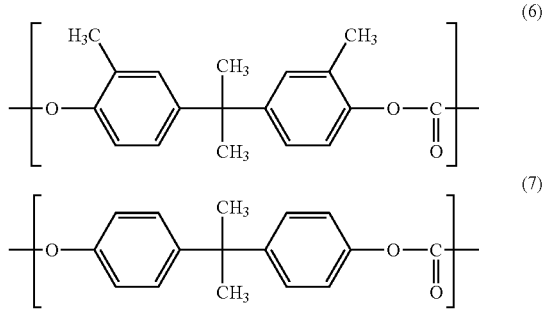

The ratio of the structural unit (c) with respect to all the structural units of the resin (B3) is preferably 50 to 100 mol %, more preferably 60 to 100 mol %, and especially preferably 70 to 100 mol %. The ratio of the structural unit (d) with respect to all the structural units of the resin (B3) is preferably 0 to 50 mol %, more preferably 0 to 40 mol %, and especially preferably 0 to 30 mol %.

The total content of the structural unit (c) and the structural unit (d) with respect to the resin (B3) is preferably 90 to 100 mol %, more preferably 95 to 100 mol %, and especially preferably 98 to 100 mol %.

The resin (B3) may contain a structural unit other than the structural unit (c) and the structural unit (d). In the case where the resin (B3) contains such other structural unit, the amount thereof with respect to all the structural units of the resin (B3) is preferably 10 mol % or smaller, more preferably 5 mol % or smaller, and especially preferably 2 mol % or smaller.

Examples of such other structural unit include a structural unit represented by general formula (8) described below, and the like.

There is no specific limitation on the method for producing the resin (B3). The resin (B3) may be produced by substantially the same method as the above-described method for producing the polycarbonate resin (a1) except that bisphenol C is used as the monomer.

Specific examples of the resin (B3) include Iupilon KH3410UR, KH3520UR and KS3410UR (produced by Mitsubishi Engineering-Plastics Corporation) and the like.

The weight average molecular weight (Mw) of the resin (B3) is preferably 15,000 to 75,000, more preferably 20,000 to 70,000, and especially preferably 25,000 to 65,000.

The glass transition point of the resin (B3) is preferably 105 to 150° C., more preferably 110 to 140° C., and especially preferably 110 to 135° C.

In the case where the resin (B3) is used as the high hardness resin, a polycarbonate resin containing a structural unit of general formula (7) is used as the polycarbonate resin (a1) in a preferred embodiment. In an especially preferred embodiment, a polycarbonate resin that contains a structural unit represented by the above-identified general formula (7) and is produced by use of a monovalent phenol represented by general formula (5) (the carbon number of R1 is 8 to 22) as a chain terminator is used. An example of such a polycarbonate resin is Iupizeta T-1380 (produced by Mitsubishi Gas Chemical Company Inc.). It is especially preferred to use Iupilon KS3410UR (produced by Mitsubishi Engineering-Plastics Corporation) as the resin (B3) and to use Iupizeta T-1380 (produced by Mitsubishi Gas Chemical Company Inc.) as the polycarbonate resin (a1).

In the case where the resin (B3) is used as the high hardness resin, another resin contained in the resin layer (B) is preferably a resin that does not contain the structural unit (c) and contains the structural unit (d), and more preferably a resin formed of only the structural unit (d). Specific examples thereof include aromatic polycarbonate resins (e.g., Iupilon S-2000, Iupilon S-1000 and Iupilon E-2000 produced by Mitsubishi Engineering-Plastics Corporation), and the like. In the case where the resin (B3) contains such another resin, the ratio of the resin (B3) with respect to all the resins contained in the resin layer (B) is preferably 45% by mass or higher, and more preferably 55% by mass or higher.

<Resin (B4)>

The resin (B4) is a resin that contains a copolymer (G) containing 5 to 20% by mass of a styrene structural unit, 60 to 90% by mass of a (meth)acrylic ester structural unit, and 5 to 20% by mass of an N-substituted maleimide structural unit. The resin (B4) may be an alloy of the copolymer (G) and the above-described copolymer (D) or another polymer. In the case where the resin (B4) is an alloy, it is preferred that the resin (B4) is an alloy of resins having as high a Tg as possible in order to avoid a decrease in the Tg of the resin layer (B).

As the styrene structural unit, any known styrene-based monomer is usable with no specific limitation. From the point of view of the ease of availability, styrene, α-methylstyrene, o-methylstyrene, m-methylstyrene, p-methylstyrene, t-butylstyrene and the like are preferred. Among these, styrene is especially preferred from the point of view of the compatibility. The copolymer (G) may contain two or more of these styrene-based monomers. The content of the styrene structural unit with respect to the entire mass of the copolymer (G) is 5 to 20% by mass, preferably 5 to 15% by mass, and more preferably 5 to 10% by mass.

Examples of the (meth)acrylic ester structural unit include structural units derived from acrylic acid, methyl acrylate, ethyl acrylate, n-butyl acrylate, 2-ethylhexyl acrylate, methacrylic acid, methyl methacrylate, ethyl methacrylate, n-butyl methacrylate, 2-ethylhexyl methacrylate, and the like. A structural unit derived from methyl methacrylate is especially preferred. The copolymer (G) may contain two or more of these (meth)acrylic ester structural units. The content of the (meth)acrylic ester structural unit with respect to the entire mass of the copolymer (G) is 60 to 90% by mass, preferably 70 to 90% by mass, and more preferably 80 to 90% by mass.

Examples of the N-substituted maleimide structural unit contained in the copolymer (G) include structural units derived from, for example, N-arylmaleimide such as N-phenylmaleimide, N-chlorophenylmaleimide, N-methylphenylmaleimide, N-naphtylmaleimide, N-hydroxyphenylmaleimide, N-methoxyphenylmaleimide, N-carboxyphenylmaleimide, N-nitrophenylmaleimide, N-tribromophenylmaleimide, and the like. From the point of view of the compatibility with an acrylic resin, a structural unit derived from N-phenylmaleimide is preferred. The copolymer (G) may contain two or more of these N-substituted maleimide structural units. The content of the N-substituted maleimide structural unit with respect to the entire mass of the copolymer (G) is 5 to 20% by mass, preferably 5 to 15% by mass, and more preferably 5 to 10% by mass.

The total content of the styrene structural unit, the (meth) acrylic ester structural unit and the N-substituted maleimide structural unit with respect to the copolymer (G) is preferably 90 to 100 mol %, more preferably 95 to 100 mol %, and especially preferably 98 to 100 mol %.

The copolymer (G) may contain a structural unit other than the above-described structural units. In the case where the copolymer (G) contains such other structural unit, the amount thereof with respect to all the structural units of the copolymer (G) is preferably 10 mol % or smaller, more preferably 5 mol % or smaller, and especially preferably 2 mol % or smaller.

Examples of such other structural unit include a structural unit derived from the following general formula (1), a structural unit derived from general formula (2), and the like.

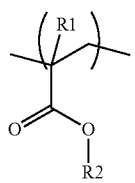

(1)

(In the formula, R1 is a hydrogen atom or a methyl group; and R2 is an alkyl group (e.g., methyl group, ethyl group, butyl group, dodecyl group, octadecyl group or the like) having a carbon number of 1 to 18 or a cycloalkyl group (e.g., cyclohexyl group, isobornyl group or the like) having a carbon number of 5 to 18 that may be substituted with a hydrocarbon group having a carbon number of 1 to 4 (preferably, an alkyl group having a carbon number of 1 to 4.)

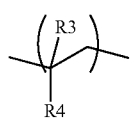

(2)

(In the formula, R3 is a hydrogen atom or a methyl group; and R4 is a cyclohexyl group that may be substituted with a hydrocarbon group (e.g., methyl group or butyl group) having a carbon number of 1 to 4.)

There is no specific limitation on the method for producing the copolymer (G). The copolymer (G) may be produced by, for example, solution polymerization, bulk polymerization or the like.

Specific examples of the resin (B4) include Delpet PM120N (produced by Asahi Kasei Chemical Corp.).

The weight average molecular weight (Mw) of the resin (B4) is preferably 50,000 to 250,000, and more preferably 100,000 to 200,000.

The glass transition point (Tg) of the resin (B4) is preferably 110 to 150° C., more preferably 115 to 140° C., and especially preferably 115 to 135° C.

In the case where the resin (B4) is used as the high hardness resin, a polycarbonate resin containing a structural unit of general formula (7) is used as the polycarbonate resin (a1) in a preferred embodiment. In an especially preferred embodiment, a polycarbonate resin that contains a structural unit represented the above-identified general formula (7) and is produced by use of a monovalent phenol represented by general formula (5) (the carbon number of R1 is 8 to 22) as a chain terminator is used. An example of such a polycarbonate resin is Iupizeta T-1380 (produced by Mitsubishi Gas Chemical Company Inc.). It is especially preferred to use, as the resin (B4), Delpet PM-120N, which contains 7% of a styrene structural unit, 86% of a (meth)acrylic ester structural unit, and 7% of an N-substituted maleimide structural unit, and to use Iupizeta T-1380 as the polycarbonate resin (a1).

<Resin (B5)>

The resin (B5) is a resin that contains a polymer (E) containing a structural unit (e) represented by the following general formula (8).

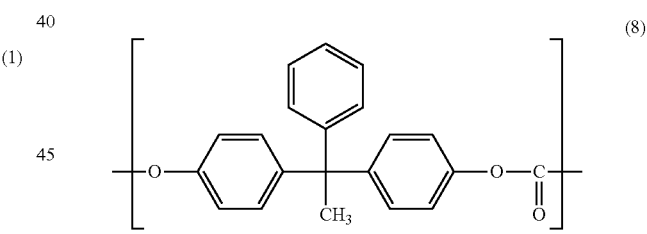

(8)

The ratio of the structural unit (e) with respect to all the structural units of the polymer (E) is preferably 80 to 100 mol %, more preferably 90 to 100 mol %, and especially preferably 95 to 100 mol %.

The polymer (E) may contain a structural unit other than the structural unit (e), but is preferably a polycarbonate resin formed of the structural unit (e). In the case where the polymer (E) contains such other structural unit, the amount thereof with respect to all the structural units of the polymer (E) is preferably 10 mol % or smaller, more preferably 5 mol % or smaller, and especially preferably 2 mol % or smaller.

Examples of such other structural unit include a structural unit (c) represented by the following general formula (6), a structural unit (d) represented by general formula (7), and the like. In other words, the resin (B5) is a resin that contains a polymer containing a structural unit (e) represented by the above-identified general formula (8), optionally containing a structural unit (c) represented by the above-identified general formula (6) and optionally containing a structural unit (d) represented by the above-identified general formula (7).

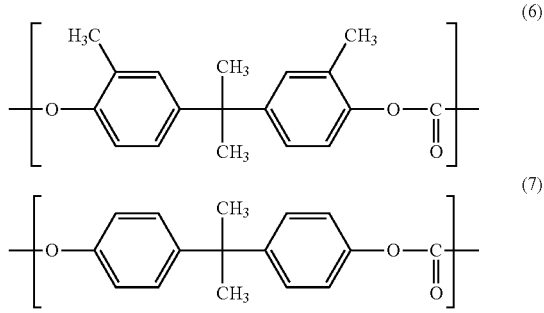

There is no specific limitation on the method for producing the polymer (E). The polymer (E) may be produced by substantially the same method as the above-described method for producing the polycarbonate resin (a1) except that bisphenol AP is used as the monomer.

A specific example of the resin (B5) is Iupizeta FPC0220 (produced by Mitsubishi Gas Chemical Company Inc.).

The weight average molecular weight (Mw) of the resin (B5) is preferably 10,000 to 1,000,000, and more preferably 15,000 to 50,000.

The glass transition point (Tg) of the resin (B5) is preferably 120 to 200° C., more preferably 130 to 190° C., and especially preferably 140 to 190° C.

In the case where the resin (B5) is used as the high hardness resin, a polycarbonate resin containing a structural unit of general formula (7) is used as the polycarbonate resin (a1) in a preferred embodiment. An example of such a polycarbonate resin is Iupilon E-2000 (produced by Mitsubishi Engineering-Plastics Corporation). It is especially preferred to use Iupizeta FPC0220 (produced by Mitsubishi Gas Chemical Company Inc.) as the resin (B5) and to use Iupilon E-2000 (produced by Mitsubishi Engineering-Plastics Corporation) as the polycarbonate resin (a1).

In the case where the resin (B5) is used as the high hardness resin, another polymer contained in the resin layer (B) is preferably a polymer that does not contain the structural unit (e) and contains the structural unit (d) described above regarding the resin (B3), and more preferably a polymer formed of only the structural unit (d). Specific examples thereof include aromatic polycarbonate resins (e.g., Iupilon S-2000, Iupilon S-1000 and Iupilon E-2000 produced by Mitsubishi Engineering-Plastics Corporation), and the like. In the case where the resin (B3) contains another polymer, the ratio of the polymer (E) with respect to all the polymers contained in the resin layer (B) is preferably 45% by mass or higher, and more preferably 55% by mass or higher.

The high hardness resin contained in the resin layer (B) may be of one type or two or more types. In the case where two or more types are selected from the resins (B1) through (B5), the resins may be selected from the same category or from different categories. In addition, the resin layer (B) may contain a high hardness resin other than the resins (B1) through (B5).

In one preferred embodiment, the high hardness resin contains the resin (B2).

The resin layer (B) may contain another resin in addition to the high hardness resins described above. Examples of such another resin include methyl methacrylate-styrene copolymer, polymethylmethacrylate, polystyrene, polycarbonate, cycloolefin(co)polymer resin, acrylonitrile-styrene copolymer, acrylonitrile-butadiene-styrene copolymer, various types of elastomers, and the like. It is preferred that the high hardness resin is the only resin included in the resin layer (B). In the case where the resin layer (B) contains another resin, the amount thereof with respect to the resin layer (B) is preferably 35% by mass or smaller, more preferably 25% by mass or smaller, and especially preferably 10% by mass or smaller.

The resin layer (B) may further contain an additive or the like. As the additive, substantially the same additives as described above in "2. Resin layer (A)" are usable in substantially the same amounts.

The thickness of the resin layer (B) influences the surface hardness and the impact resistance of the resin sheet for molding. Namely, if the resin layer (B) is too thin, the surface hardness is decreased; whereas if the resin layer (B) is too thick, the impact resistance is decreased. The thickness of the resin layer (B) is preferably 10 to 250 μm, more preferably 30 to 200 μm, and especially preferably 60 to 150 μm.

4. Stacked Body of the Resin Layer (A) and the Resin Layer (B)

As described above, a further layer may be present between the resin layer (A) and the resin layer (B). Herein, a case where the resin layer (B) is stacked immediately on the resin layer (A) will be described. There is no specific limitation on the method for stacking the layers. In the case where a further layer is present between the resin layer (A) and the resin layer (B), the stacking may be performed in substantially the same manner. There are various methods including, for example, a method of stacking the resin layer (A) and the resin layer (B) formed independently and heating and pressure-bonding both of the layers; a method of stacking the resin layer (A) and the resin layer (B) formed independently and bonding the layers with an adhesive; a method of co-extrusion-molding the resin layer (A) and the resin layer (B); a method of in-molding the resin layer (A) to the resin layer (B) formed in advance to integrate the layers; and the like. Among these methods, a method of co-extrusion-molding the layers is preferred from the point of view of the production cost and the productivity There is no specific limitation on the co-extrusion method. For example, according to a feed block system, the resin layer (B) is located on one surface of the resin layer (A) by a feed block, the layers are extruded into a sheet by a T-die, and then the layers are cooled while a molding roll is run thereon to form a desired stacked body. According to a multi-manifold system, the resin layer (B) is located on one surface of the resin layer (A) in a multi-manifold die, the layers are extruded into a sheet, and then the layers are cooled while a molding roll is run thereon to form a desired stacked body.

The total thickness of the resin layer (A) and the resin layer (B) is preferably 0.5 to 3.5 mm, more preferably 0.5 to 3.0 mm, and especially preferably 1.2 to 3.0 mm. The total thickness is 0.5 mm or greater, so that the sheet may be kept rigid. The total thickness is 3.5 mm or less, so that even when, for example, a touch panel is set below the sheet, the sensitivity of the touch panel may be prevented from being decreased. The ratio of the thickness of the resin layer (A) with respect to the total thickness of the resin layer (A) and the resin layer (B) is preferably 75% to 99%, more preferably 80% to 99% and especially preferably 85 to 99%. The ratio is in the above-described range, so that a high hardness and a high impact resistance may be both provided.

5. Hard Coat Layer (C)

The resin sheet according to the present invention includes the hard coat layer (C) on the resin layer (B). A further layer may be present between the hard coat layer (C) and the resin layer (B). It is preferred that the hard coat layer (C) is stacked immediately on the resin layer (B).

A resin sheet including the hard coat layer (C) having a high hardness at a surface thereof, especially a resin sheet in which the resin layer (A) contains a polycarbonate resin as a base material, has a higher impact resistance, is higher in the safety and is more lightweight than a usual glass plate. Such a resin sheet is easier to be bent than a usual glass plate, and is not easily broken when being slightly bent. A conceivable reason for this is that the hard coat layer (C) in the resin sheet has a certain level of flexibility.

The resin sheet according to the present invention includes the resin layer (B) between the resin layer (A) and the hard coat layer (C). This may further improve the hardness of the resin sheet. In the case where the hard coat layer (C) is provided immediately on the resin layer (A) formed of polycarbonate, there may be a problem that the resin sheet has a low elasticity and is easy to buckle. The provision of the resin layer (B) may solve such a problem. According to the present invention, the resin sheet includes a predetermined stacked body (resin layer (A), resin layer (B) and hard coat layer (C)) and is molded under predetermined heat pressing conditions. This allows the heat molding to be performed while an inconvenience such as cracking or the like is suppressed.

The hard coat layer (C) may be formed of any known hard coat such as an acrylic, silicon-based, melamine-based urethane-based or epoxy-based hard coat with no specific limitation. Among these, an acrylic hard coat is preferred for the hard coat layer (C). In this specification, the "acrylic hard coat" refers to a film having a crosslinking structure formed by polymerizing a monomer, an oligomer or a prepolymer containing a (meth)acryloyl group as a polymerization group. It is preferred that a composition of the acrylic hard coat contains 2 to 98% by mass of a (meth)acrylic monomer, 2 to 98% by mass of a (meth)acrylic oligomer, and 0 to 15% by mass of a surface modifier, and further contains 0.001 to 7 parts by weight of a photoinitiator with respect to 100 parts by weight as the sum of the (meth)acrylic monomer, the (meth)acrylic oligomer and the surface modifier.

More preferably, the hard coat layer (C) contains 5 to 50% by mass of a (meth)acrylic monomer, 50 to 95% by mass of a (meth)acrylic oligomer, and 1 to 10% by mass of a surface modifier. Especially preferably, the hard coat layer (C) contains 20 to 40% by mass of a (meth)acrylic monomer, 60 to 80% by mass of a (meth)acrylic oligomer, and 2 to 5% by mass of a surface modifier.

The amount of the photoinitiator with respect to 100 parts by mass as the sum of the (meth)acrylic monomer, the (meth)acrylic oligomer and the surface modifier is more preferably 0.01 to 5 parts by mass, and especially preferably 0.1 to 3 parts by mass.

(1) (Meth)Acrylic Monomer

Any (meth)acrylic monomer containing a (meth)acryloyl group as a functional group in a molecule is usable. The (meth)acrylic monomer may be a monofunctional monomer, a bifunctional monomer or a tri- or more-functional monomer.

Examples of the monofunctional monomer include (meth) acrylic acid and (meth)acrylic ester. Specific examples of the bifunctional and/or tri- or more-functional (meth)acrylic monomer include diethyleneglycoldi(meth)acrylate, dipropyleneglycoldi(meth)acrylate, tripropyleneglycoldi(meth) acrylate, 1,6-hexanedioldi(meth)acrylate, bisphenol A diglycidyletherdi(meth)acrylate, tetraethyleneglycoldi(meth) acrylate, neopentylglycol hydroxypivalate diacrylate, neopentylglycol di(meth)acrylate, 1,4-butanedioldiacrylate, 1,3-butyleneglycoldi(meth)acrylate, dicyclopentanyldi(meth)acrylate, polyethyleneglycoldiacrylate, 1,4-butanediololigoacrylate, neopentylglycololigoacrylate, 1,6-hexanediololigoacrylate, trimethylolpropanetri(meth)acrylate, trimethylolpropaneethoxytri(meth)acrylate, trimethylolpropanepropoxytri(meth)acrylate, pentaerythritoltri(meth)acrylate, glycerylpropoxytri(meth)acrylate, trimethylolpropanetrimethacrylate, trimethylolpropaneethyleneoxide-added triacrylate, glycerinpropyleneoxide-added triacrylate, pentaerythritoltetraacrylate, and the like.

The hard coat layer (C) may contain one type of, or two or more types of, (meth)acrylic monomer.

(2) (Meth)acrylic Oligomer

Examples of the (meth)acrylic oligomer include two- or more-functional urethane(meth)acrylate oligomer (hereinafter, also referred to as "multi-functional urethane(meth) acrylate oligomer), two- or more-functional polyester(meth) acrylate oligomer (hereinafter, also referred to as "multi-functional polyester(meth)acrylate oligomer), two- or more-functional epoxy(meth)acrylate oligomer (hereinafter, also referred to as "multi-functional epoxy(meth)acrylate oligomer), and the like. The hard coat layer (C) may contain one type of, or two or more types of, (meth)acrylic oligomer.

Examples of the multi-functional urethane(meth)acrylate oligomer include a urethane formation reaction product of a (meth)acrylate monomer, containing at least one (meth) acryloyloxy group and a hydroxy group in one molecule, and polyisocyanate; a urethane formation reaction product of an isocyanate compound, obtained by a reaction of a polyol and polyisocyanate, and (meth)acrylate monomer containing at least one (meth)acryloyloxy group and a hydroxy group in one molecule; and the like.

Examples of the (meth)acrylate monomer containing at least one (meth)acryloyloxy group and a hydroxy group in one molecule usable for the urethane formation reaction include 2-hydroxyethy(meth)acrylate, 2-hydroxypropyl (meth)acrylate, 2-hydroxybutyl(meth)acrylate, 2-hydroxy-3-phenoxypropyl(meth)acrylate, glycerindi(meth)acrylate, trimethylolpropanedi(meth)acrylate, pentaerythritoltri (meth)acrylate, and dipentaerythritolpenta(meth)acrylate.

Examples of the polyisocyanate usable for the urethane formation reaction include di- and tri-isocyanates such as hexamethylenediisocyanate, lysinediisocyanate, isophoronediisocyanate, dicyclohexylmethanediisocyanate, tolylenediisocyanate, xylylenediisocyanate, diisocyanate obtained by hydrogenation of an aromatic isocyanate among the above-listed diisocyanates (e.g., diisocyanate such as hydrogenated tolylenediisocyanate, hydrogenated xylylenediisocyanate, or the like), triphenylmethanetriisocyanate, dimethylenetriphenyltriisocyanate, and the like; and polyisocyanates obtained by multimerization of diisocyanate.

Examples of the polyol generally usable for the urethane formation reaction include aromatic, aliphatic and alicyclic polyols, polyesterpolyol, polyetherpolyol, and the like. Examples of the aliphatic and alicyclic polyols usually include 1,4-butanediol, 1,6-hexanediol, neopentylglycol, ethyleneglycol, propyleneglycol, trimethylolethane, trimethylolpropane, dimethylolheptane, dimethylolpropionic acid, dimethylolbutanoic acid, glycerin, hydrogenated bisphenol A, and the like.

An example of the polyesterpolyol is obtained by a dehydration condensation reaction of a polyol described above and polycarboxylic acid. Specific compounds of the polycarboxylic acid include succinic acid, adipic acid, maleic acid, trimellitic acid, hexahydrophthalic acid, phthalic acid, isophthalic acid, terephthalic acid, and the like. These polycarboxylic acids may be anhydrides. Examples of the polyetherpolyol include polyalkyleneglycol, and polyoxyalkylene-denatured polyol obtained by a reaction of a polyol described above or a phenol and alkyleneoxide.

The multi-functional polyester(meth)acrylate oligomer is obtained by a dehydration condensation reaction of (meth) acrylic acid, polycarboxylic acid and polyol. Examples of the polycarboxylic acid usable for the dehydration condensation reaction include succinic acid, adipic acid, maleic acid, itaconic acid, trimellitic acid, pyromellitic acid, hexahydrophthalic acid, phthalic acid, isophthalic acid, terephthalic acid, and the like. These polycarboxylic acids may be anhydrides. Examples of the polyol usable for the dehydration condensation reaction include 1,4-butanediol, 1,6-hexanediol, diethyleneglycol, triethyleneglycol, propyleneglycol, neopentylglycol, dimethylolheptane, dimethylolpropionic acid, dimethylolbutanoic acid, trimethylolpropane, ditrimethylolpropane, pentaerythritol, dipentaerythritol, and the like.

The multi-functional epoxy(meth)acrylate oligomer is obtained by an addition reaction of polyglycidylether and (meth)acrylic acid. Examples of the polyglycidylether include ethyleneglycoldiglycidylether, propyleneglycoldiglycidylether, tripropyleneglycoldiglycidylether, 1,6-hexanedioldiglycidylether, bisphenol A diglycidylether, and the like.

(3) Surface Modifier

The surface modifier usable in the present invention is, for example, a leveling agent, an antistatic agent, a surfactant, a water and oil repellant, an inorganic particle, an organic particle or the like, and changes the surface performance of the hard coat layer (C).

Examples of the leveling agent include polyether-denatured polyalkylsiloxane, polyether-denatured siloxane, polyester-denatured hydroxy group-containing polyalkylsiloxane, alkyl group-containing polyether-denatured polydimethylsiloxane, denatured polyether, silicon-denatured acrylic resin, and the like.

Examples of the antistatic agent include glycerin aliphatic acid ester monoglyceride, glycerin aliphatic acid ester organic acid monoglyceride, polyglycerin aliphatic acid ester, sorbitan aliphatic acid ester, cationic surfactant, anionic surfactant, and the like.

Examples of the inorganic particle include silica particle, alumina particle, zirconia particle, silicon particle, silver particle, glass particle, and the like.

Examples of the organic particle include acrylic particle, silicon particle, and the like.

Examples of the surfactant and the water and oil repellent include fluorine-containing surfactants and the water and oil repellents such as oligomer containing a fluorine-containing group and a lipophilic group, oligomer containing a fluorine-containing group, a hydrophilic group, a lipophilic group and a UV-reactive group, and the like.

(4) Photoinitiator

The hard coat layer (C) may contain a photoinitiator. In this specification, the "photoinitiator" refers to a photoradical generator.

Examples of a monofunctional photoinitiator usable in the present invention include acetophenone-based initiators such as 4-(2-hydroxyethoxy)phenyl(2-hydroxy-2-propyl) ketone [Darocur 2959 produced by Merck KGaA], α-hydroxy-α,α'-dimethylacetophenone [Darocur-1173 produced by Merck KGaA], methoxyacetophenone, 2,2'-dimethoxy-2-phenylacetophenone [Irgacure-651], 1-hydroxy-cyclohexylphenylketone, and the like; benzoinether-based initiators such as bezoinethylether, benzoinisopropylether, and the like; halogenated ketone; acylphosphineoxide; acylphosphonate; and the like.

(5) Method for Forming the Hard Coat Layer (C)

There is no specific limitation on the method for forming the hard coat layer (C). For example, the hard coat layer (C) may be formed by applying a hard coat liquid on a layer to be located below the hard coat layer (C) (e.g., resin layer (B)) and then subjecting the hard coat liquid to photopolymerization.

There is no specific limitation on the method for applying the hard coat liquid. Any known method is usable. Example of the method include spin coating, dipping, spraying, slide coating, bar coating, roll coating, gravure coating, meniscus coating, flexo printing, screen printing, beat coating, brush-coating, and the like.

For irradiation with light in the photopolymerization, a lamp having a luminosity distribution in a wavelength range of 420 nm or shorter is used. Examples of such a lamp include a low-pressure mercury lamp, a middle-pressure mercury lamp, a high-pressure mercury lamp, an ultra high-pressure mercury lamp, a chemical lamp, a black light lamp, a microwave-excited mercury lamp, a metal halide lamp, and the like.

The irradiation intensity of the lamp is a factor that influences the polymerization degree of the polymer to be obtained, and is controlled as necessary in accordance with the performance of the product to be produced. In the case where a fragmentation-type initiator containing a usual acetophenone group is contained, the illuminance is preferably in the range of 0.1 to 300 mW/cm$^2$. It is especially preferred to use a metal halide lamp to obtain an illuminance of 10 to 40 mW/cm$^2$.

The photopolymerization reaction is inhibited by oxygen in the air or oxygen dissolved in a reactive composition. Therefore, it is desired to perform the irradiation with light by use of a technique that may erase such inhibition of reaction by oxygen. According to one such technique, the reactive composition is covered a film formed of polyethyleneterephthalate or Teflon (registered trademark) to prevent contact of the reactive composition with oxygen, and the reactive composition is irradiated with light through the film. Alternatively, the composition may be irradiated with light through a light-transmissive window in an inert atmosphere in which oxygen is substituted with inert gas such as nitrogen gas, carbon dioxide or the like.

For the purpose of improving the adhesiveness of the hard coat layer (C), a pre-process may occasionally be performed on the surface on which the hard coat liquid is to be applied. Examples of the pre-process include known methods such as sand blasting, solvent treatment, corona discharge, chromic acid treatment, flame treatment, heat wave treatment, ozone treatment, UV treatment, primer treatment with a resin composition, and the like.

It is preferred that the hard coat layer (C) has a pencil hardness of 2H or higher when being irradiated with UV by use of a metal halide lamp having a UV light (254 nm) irradiation output of 20 mW/cm$^2$.

The thickness of the hard coat layer (C) is desirably 1 μm or greater and 40 μm or less, and more desirably 2 μm or greater and 10 μm or less. The thickness is 1 μm or greater, so that a sufficient hardness may be obtained. The thickness is 40 μm or less, so that generation of cracks may be suppressed when the layer is bent. The thickness of the hard coat layer (C) may be measured by observing a cross-section thereof with a microscope or the like and actually measuring a distance from the interface between the film of the hard coat liquid and the layer below the film to the surface of the film.

In addition, the hard coat layer (C) may be decorated. For example, the hard coat layer (C) may be subjected to at least one of a reflection prevention treatment, an anti-fouling treatment, an antistatic treatment, a weather-resistant treatment, and an anti-glare treatment. There is no specific limitation on the method for these treatments. Any known method is usable. Examples of such a method include a method of applying a reflection-decreasing coat, a method of vapor-depositing a dielectric thin film, a method of applying an antistatic coat, and the like.

The pencil hardness of the resin sheet (polycarbonate sheet) is preferably 2H or higher, for example, 2H or higher and 4H or lower, and especially preferably 3H or higher and 4H or lower. Herein, the "pencil hardness of the resin sheet" refers to the following. Pencils are pressed to a surface of the hard coat layer (C) at an angle of 45 degrees and a load of 750 g, while the hardness of the pencils is increased. The "pencil hardness of the resin sheet" refers to the hardness of the hardest pencil among the pencils that did not leave a scratch (scratch hardness test (pencil method) conformed to JIS K 5600-5-4: 1999).

6. Press Molding Method

The press molding method includes a step of pre-heating the polycarbonate sheet (step (I)) before heat-press-molding the polycarbonate sheet, a step of locating the pre-heated sheet into a heat press mold (step (II)), and a step of performing clamping and molding (step (III)). Hereinafter, each of the steps of the press molding method in an embodiment will be described.

Step (I)

In this step, the above-described polycarbonate sheet (resin sheet) is pre-heated to a temperature in the range of the glass transition point of the resin layer (A)–45° C. or higher and the glass transition point of the resin layer (A) or lower. The temperature of the pre-heating is set to a temperature that is the glass transition point of the resin layer (A)–45° C. or higher, so that the sheet may be prevented from being broken when being pressed. The temperature of the pre-heating is set to a temperature that is the glass transition point of the resin layer (A) or lower, so that the hard coat layer may be suppressed from being cracked when being pressed. The "temperature of the pre-heating" refers to the temperature of the polycarbonate sheet pre-heated before the step of locating the pre-heated sheet into the heat press mold (step (II)).

There is no specific limitation on the method for the pre-heating. Examples of the method include a method of drying in a dryer, a method of heating by radiation, and the like.

Step (II)

In this step, the above-described pre-heated polycarbonate sheet (resin sheet) is located between an upper die and a lower die of a metal mold. At this point, the time period after the step (I) is finished until the polycarbonate sheet is located between the upper die and the lower die of the mold (location time) is 90 seconds or shorter. The location time is 90 seconds or shorter, so that the temperature of the pre-heated sheet is suppressed from being decreased, and the sheet may be prevented from being broken when being pressed.

Preferably, the location time is as short as possible from the point of view of suppression of springback. The location time is preferably 60 seconds or shorter, and more preferably 50 seconds or shorter.

Step (III)

In this step, the mold is clamped to press one of the upper die and the lower die to the other of the upper die and the lower die, and as a result, a press-molded body of the above-described polycarbonate sheet (resin sheet) is obtained. At this point, the temperature of the mold is set to a temperature that is the glass transition point (Tg) of the resin layer (A) or lower. The temperature of the mold is set to a temperature that is the Tg of the resin layer (A) or lower, so that the hard coat layer may be suppressed from being cracked.

The temperature of the mold is preferably a temperature in the range of the glass transition point of the resin layer (A)–20° C. or higher and the glass transition point or lower. From the point of view of suppression of springbuck, the temperature of the mold is more preferably a temperature in the range of the glass transition point of the resin layer (A)–10° C. or higher and the glass transition point or lower, and still more preferably a temperature in the range of the glass transition point of the resin layer (A)–5° C. to the glass transition point.

Herein, the "temperature of the mold" refers to the temperature of a portion, of at least one of the upper die and the lower die, that contacts the polycarbonate sheet. Therefore, it is sufficient that the portion, of at least one of the upper die and the lower die of the mold, that contacts the polycarbonate sheet fulfills the above-described temperature conditions. It is preferred that the portions of both of the upper die and the lower die that contact the polycarbonate sheet fulfill the above-described temperature conditions.

There is no specific limitation on the material of the mold as long as the material may be controlled to have a temperature in the above-described predetermined range. Examples of the usable material include metals such as aluminum, stainless steel, steel, and the like. In the press molding in this step, a two-dimensional bending mold and also molds having various shapes of curved surface (e.g., two-dimensional-shaped molds (e.g., molds giving a radius of curvature of 70 mm or less to a 2 mm-thick sheet, or tunnel-shaped molds having a radius of curvature of 50 mm or less), semispherical molds, three-dimensional molds (e.g., having a radius of curvature of about 100 mmR or greater)) are usable.

According to the method described in Patent Document 6, a 2 mm-thick sheet is cracked even when being molded two-dimensionally to have a radius of curvature of 100 mm. Therefore, merely a molded body having a large radius of curvature (loose shape) is obtained. In addition, it is impossible to mold a sheet into a three-dimensional shape.

There is no specific limitation on the method for the clamping. A servo motor, a hydraulic jack, an air cylinder, or weighting with a heavy item is usable.

The clamping force on the mold is preferably 3000 kgf or smaller. From the point of view of preventing the surface from having protrusions and recesses as a result of being crumpled, the clamping force on the mold is more preferably 2000 kgf or smaller, still more preferably 100 kgf or larger and 1500 kgf or smaller, and especially preferably 100 kgf or larger and 1000 kgf or smaller.

7. Press-Molded Body

The press-molded body obtained by the above-described production method is preferably usable as a molded product having any of various shapes of curved surface that is required to have a certain hardness (e.g., a two-dimensional shape (e.g., a 2 mm-thick sheet having a radius of curvature of 70 mm or less, or a tunnel shape having a radius of curvature of 50 mm or less), or a three-dimensional shape (e.g., having a radius of curvature of about 100 mmR or greater)). For example, a component including a flat portion and a curved portion continued from the flat portion may be produced successfully. Therefore, a product having a novel design or function may be provided.

In the case where the conventional resin sheet is molded into a product having the above-described shape, there are many inconveniences that cracks are generated at the time of heat molding such as heat press molding, vacuum molding, pressure forming, TOM molding or the like. In order to suppress the generation of cracks at the time of heat molding, a measure is needed such that the hardness of the hard coat is decreased. However, in the case where the hardness of the hard coat is decreased, there are other problems that the hard coat is too soft and is easily scratched and that the chemical resistance is decreased although the heat moldability is improved.

By contrast, according to the production method of the present invention, the generation of cracks is suppressed as described above. Therefore, molded bodies of various shapes may be provided without decreasing the hardness of the hard coat. The press-molded body obtained by the production method according to the present invention includes a hard coat layer having a high hardness in a surface layer thereof, and therefore is difficult to be scratched and has a high chemical resistance. The press-molded body according to the present invention may utilize such characteristics to be used for, for example, components of display surfaces of personal computers, mobile phones and the like; exterior and interior parts of automobiles; and curved housings and curved front plates of mobile phone terminals, personal computers, tablet-type personal computers, car navigation systems and the like. For example, in one embodiment, the press-molded body is a component or a part for use in automobiles, electric and electronic devices, consumer electronics or aircrafts.

EXAMPLES

Hereinafter, examples of the present invention will be described. The present invention is not limited to the form of any of the following examples. In this specification, "%" refers to "% by mass" unless otherwise specified.

<Measurement of the Glass Transition Point (Tg)>

The glass transition point of each of the polycarbonate resin and the high hardness resin used in each of the examples and comparative examples were measured at a temperature rise rate of 10° C./min. in a nitrogen atmosphere by use of a differential scanning calorimetry device DSC7020 produced by Hitachi Hi-Tech Science Corporation. The weight of the resin used for the measurement is 10 to 20 mg.

<Measurement of the Pencil Hardness of the High Hardness Resin>

Regarding the stacked body (resin sheet) of the resin layer (B) and the resin layer (A), before the formation of the hard coat layer (C), produced in each of the examples and the comparative examples, the pencil hardness of the resin layer (B) was evaluated by a scratch hardness test (pencil method) conformed to JIS K 5600-5-4: 1999. Pencils were pressed to a surface of the resin layer (B) at an angle of 45 degrees and a load of 750 g, while the hardness of the pencils was increased. The hardness of the hardest pencil among the pencils that did not leave a scratch was evaluated as the pencil hardness of the high hardness resin to be used for forming the resin layer (B).

<Measurement of the Pencil Hardness of the Resin Sheet>

The resin sheet, before the heat pressing step, produced in each of the examples and the comparative examples was evaluated by a scratch hardness test (pencil method) conformed to JIS K 5600-5-4: 1999. Pencils were pressed to a surface of the hard coat layer (C) at an angle of 45 degrees and a load of 750 g, while the hardness of the pencils was increased. The hardness of the hardest pencil among the pencils that did not leave a scratch was evaluated as the pencil hardness.

The resin sheets having a hardness of 2H or higher were considered to pass the test.

<Evaluation Method for the Springback>

The radius R of curvature of the molded body was measured at a rate of 6 mm/sec. by use of a probe-type contour meter (Contour Record 2700SD3 produced by Tokyo Seimitsu Co., Ltd.) to evaluate the springback. A radius R of curvature that is closer to that of the die (lower die) is evaluated as being better.

<Heat Press Machine>

The heat press machine used in the examples and the comparative examples has a mechanism of being driven to clamp by a servo motor. The maximum value of the clamping force is 3000 kgf.

<Evaluation of the Hard Coat Cracks>

Regarding the press-molded body produced in each of the examples and the comparative examples, it was checked whether a portion of 50 mmR was cracked or not.

Example 1

A stacked body formed of the resin layer (A) and the resin layer (B) was molded by use of a multi-axial extruder that includes a monoaxial extruder having a shaft diameter of 35 mm, a monoaxial extruder having a shaft diameter of 65 mm, a feed block coupled with each of the extruders, and a T-die coupled with the feed block. Specifically, the high hardness resin (B2) (copolymer of 21% by mass of a methyl methacrylate structural unit, 64% by mass of a styrene structural unit and 15% by mass of a maleic anhydride structural unit; Resisfy R100 (produced by Denka Company Limited), Tg: 124° C., weight average molecular weight (Mw): 171,000, pencil hardness: H) was continuously introduced into the monoaxial extruder having a shaft diameter of 35 mm, and was extruded under the conditions of a cylinder temperature of 230° C. and an extrusion rate of 2.6 kg/h. Separately, a polycarbonate resin (Iupizeta T-1380 produced by Mitsubishi Gas Chemical Company Inc., Tg: 125° C., weight average molecular weight (Mw): 44,500) was continuously introduced into the monoaxial extruder having a shaft diameter of 65 mm, and was extruded under the conditions of a cylinder temperature of 240° C. and an extrusion rate of 83.0 kg/h.

The extruded high hardness resin and the extruded polycarbonate resin were introduced into the feed block including two types of two-layer distribution pins, and the high hardness resin and the polycarbonate resin were stacked on each other at a temperature of 240° C. The resultant body was introduced into the T-die having a temperature of 240° C. and was extruded into a sheet. The sheet was cooled while a mirror surface of each of three mirror-surface finishing rolls, respectively having temperatures of 120° C., 130° C. and 190° C. sequentially from the most upstream roll, was transferred onto the sheet. As a result, a stacked body of the resin layer (B) and the polycarbonate resin layer (resin layer (A)) was obtained. The obtained stacked body had a thickness of 2 mm, and the resin layer (B) had a thickness of 60 μm at the center or the vicinity thereof.

The hard coat layer (C) was formed on the resin layer (B) side of the stacked body obtained above. The materials of the hard coat layer (C) were as follows.

(Meth)acrylic oligomer: U6HA, hexa-functional urethane acrylate oligomer (produced by Shin-Nakamura Chemical Co., Ltd.), 60% by mass (Meth)acrylic monomer: 4EG-A PEG200 #diacrylate (tetraethyleneglycoldiacrylate produced by Kyoeisha Chemical Co., Ltd.), 35% by mass Surface modifier: RS-90, oligomer containing a fluorine-containing group, a hydrophilic group, a lipophilic group and an UV-reactive group (produced by DIC Corporation), 5% by mass Photoinitiator: 1-184 (produced by BASF SE [compound name: 1-hydroxy-cyclohexylphenylketone])

1 part by mass of the photoinitiator is contained with respect to 100 parts by mass of a mixture of the (meth)acrylic oligomer, the (meth)acrylic monomer and the surface modifier.

The above-listed materials were applied to the stacked body by a bar coater, and irradiated with light from a metal halide lamp (20 mW/cm$^2$) for 5 seconds to cure the hard coat layer. As a result, a resin sheet including the resin layer (A), the resin layer (B) and the hard coat layer (C) stacked sequentially was produced. The hard coat layer (C) had a thickness of 6 μm.

Heat Pressing Step (Step I)

The obtained resin sheet was put into a shelf dryer set at 120° C. and was pre-heated for 3 minutes. The temperature of the sheet removed from the shelf dryer was 80° C.

(Step II)

50 seconds after being removed from the shelf dryer, the sheet was put into a lower die of an aluminum heat press mold (FIG. 1).

(Step III)

The resin sheet was heat-press-molded in the aluminum heat press mold (FIG. 1) having a clearance (gap, between upper and lower dies of the mold, into which the sheet to be molded is to be inserted) of 2 mm and a radius R of curvature of the lower die of 50 mm. The heat press molding was performed at a temperature of each of the upper and lower dies of 122° C. by a clamping force of 200 kgf for a pressing time of 3 minutes.

Example 2

A stacked body formed of the resin layer (A) and the resin layer (B) was molded by use of the same multi-axial extruder as used in example 1. Specifically, the high hardness resin (B2) (copolymer of 6% by mass of a methyl methacrylate structural unit, 71% by mass of a styrene structural unit and 23% by mass of a maleic anhydride structural unit; Resisfy R310 (produced by Denka Company Limited), Tg: 141° C., weight average molecular weight (Mw): 132,000, pencil hardness: 2H) was continuously introduced into the monoaxial extruder having a shaft diameter of 35 mm, and was extruded under the conditions of a cylinder temperature of 240° C. and an extrusion rate of 2.6 kg/h. Separately, a polycarbonate resin (Iupilon S-1000 produced by Mitsubishi Engineering-Plastics Corporation, Tg: 147° C., weight average molecular weight (Mw): 49,500) was continuously introduced into the monoaxial extruder having a shaft diameter of 65 mm, and was extruded under the conditions of a cylinder temperature of 280° C. and an extrusion rate of 83.0 kg/h.

The extruded high hardness resin and the extruded polycarbonate resin were introduced into the feed block including two types of two-layer distribution pins, and the high hardness resin and the polycarbonate resin were stacked on each other at a temperature of 280° C. The resultant body was introduced into the T-die having a temperature of 280° C. and was extruded into a sheet. The sheet was cooled while a mirror surface of each of three mirror-surface finishing rolls, respectively having temperatures of 120° C., 130° C. and 190° C. sequentially from the most upstream roll, was transferred onto the sheet. As a result, a stacked body of the resin layer (B) and the polycarbonate resin layer (resin layer (A)) was obtained. The obtained stacked body had a thickness of 2 mm, and the resin layer (B) had a thickness of 60 μm at the center or the vicinity thereof.

The hard coat layer (C) was formed in substantially the same manner as in example 1. As a result, a resin sheet including the resin layer (A), the resin layer (B) and the hard coat layer (C) stacked sequentially was produced.

Heat Pressing Step (Step I)

The obtained resin sheet was put into a shelf dryer set at 150° C. and was pre-heated for 3 minutes. The temperature of the sheet removed from the shelf dryer was 110° C.

(Step II)

50 seconds after being removed from the shelf dryer, the sheet was put into a lower die of an aluminum heat press mold (FIG. 1).

(Step III)

The resin sheet was heat-press-molded in the aluminum heat press mold (FIG. 1) having a clearance (gap, between upper and lower dies of the mold, into which the sheet to be molded is to be inserted) of 2 mm and a radius R of curvature of the lower die of 50 mm. The heat press molding was performed at a temperature of each of the upper and lower dies of 144° C. by a clamping force of 200 kgf for a pressing time of 3 minutes.

Example 3

A resin sheet including the resin layer (A), the resin layer (B) and the hard coat layer (C) stacked sequentially was obtained in substantially the same manner as in example 1.

Heat Pressing Step (Step I)

The obtained resin sheet was put into a shelf dryer set at 120° C. and was pre-heated for 10 minutes. The temperature of the sheet removed from the shelf dryer was 90° C.

(Step II)

50 seconds after being removed from the shelf dryer, the sheet was put into a lower die of an aluminum heat press mold (FIG. 1).

(Step III)

The resin sheet was heat-press-molded in the aluminum heat press mold (FIG. 1) having a clearance (gap, between upper and lower dies of the mold, into which the sheet to be molded is to be inserted) of 2 mm and a radius R of curvature of the lower die of 50 mm. The heat press molding was performed at a temperature of each of the upper and lower dies of 122° C. by a clamping force of 200 kgf for a pressing time of 3 minutes.

Example 4

A resin sheet including the resin layer (A), the resin layer (B) and the hard coat layer (C) stacked sequentially was obtained in substantially the same manner as in example 1.

Heat Pressing Step (Step I)

The obtained resin sheet was put into a shelf dryer set at 120° C. and was pre-heated for 3 minutes. The temperature of the sheet removed from the shelf dryer was 80° C.

(Step II)

50 seconds after being removed from the shelf dryer, the sheet was put into a lower die of an aluminum heat press mold (FIG. 1).

(Step III)

The resin sheet was heat-press-molded in the aluminum heat press mold (FIG. 1) having a clearance (gap, between upper and lower dies of the mold, into which the sheet to be molded is to be inserted) of 2 mm and a radius R of curvature of the lower die of 50 mm. The heat press molding was performed at a temperature of each of the upper and lower dies of 122° C. by a clamping force of 1000 kgf for a pressing time of 3 minutes.

Example 5

A resin sheet including the resin layer (A), the resin layer (B) and the hard coat layer (C) stacked sequentially was obtained in substantially the same manner as in example 1.

Heat Pressing Step (Step I)

The obtained resin sheet was put into a shelf dryer set at 120° C. and was pre-heated for 6 minutes. The temperature of the sheet removed from the shelf dryer was 85° C.

(Step II)

50 seconds after being removed from the shelf dryer, the sheet was put into a lower die of an aluminum heat press mold (FIG. 1).

(Step III)

The resin sheet was heat-press-molded in the aluminum heat press mold (FIG. 1) having a clearance (gap, between upper and lower dies of the mold, into which the sheet to be molded is to be inserted) of 2 mm and a radius R of curvature of the lower die of 50 mm. The heat press molding was performed at a temperature of each of the upper and lower dies of 122° C. by a clamping force of 1000 kgf for a pressing time of 3 minutes.

Example 6

A resin sheet including the resin layer (A), the resin layer (B) and the hard coat layer (C) stacked sequentially was obtained in substantially the same manner as in example 1.

Heat Pressing Step (Step I)

The obtained resin sheet was put into a shelf dryer set at 120° C. and was pre-heated for 6 minutes. The temperature of the sheet removed from the shelf dryer was 85° C.

(Step II)

50 seconds after being removed from the shelf dryer, the sheet was put into a lower die of an aluminum heat press mold (FIG. 1).

(Step III)

The resin sheet was heat-press-molded in the aluminum heat press mold (FIG. 1) having a clearance (gap, between upper and lower dies of the mold, into which the sheet to be molded is to be inserted) of 2 mm and a radius R of curvature of the lower die of 50 mm. The heat press molding was performed at a temperature of each of the upper and lower dies of 122° C. by a clamping force of 1900 kgf for a pressing time of 3 minutes.

Example 7

A resin sheet including the resin layer (A), the resin layer (B) and the hard coat layer (C) stacked sequentially was obtained in substantially the same manner as in example 1.

Heat Pressing Step (Step I)

The obtained resin sheet was put into a shelf dryer set at 120° C. and was pre-heated for 6 minutes. The temperature of the sheet removed from the shelf dryer was 85° C.

(Step II)

50 seconds after being removed from the shelf dryer, the sheet was put into a lower die of an aluminum heat press mold (FIG. 1).

(Step III)

The resin sheet was heat-press-molded in the aluminum heat press mold (FIG. 1) having a clearance (gap, between upper and lower dies of the mold, into which the sheet to be molded is to be inserted) of 2 mm and a radius R of curvature of the lower die of 50 mm. The heat press molding was performed at a temperature of each of the upper and lower dies of 122° C. by a clamping force of 100 kgf for a pressing time of 3 minutes.

Example 8

A resin sheet including the resin layer (A), the resin layer (B) and the hard coat layer (C) stacked sequentially was obtained in substantially the same manner as in example 1.

Heat Pressing Step (Step I)

The obtained resin sheet was put into a shelf dryer set at 120° C. and was pre-heated for 6 minutes. The temperature of the sheet removed from the shelf dryer was 85° C.

(Step II)

10 seconds after being removed from the shelf dryer, the sheet was put into a lower die of an aluminum heat press mold (FIG. 1).

(Step III)

The resin sheet was heat-press-molded in the aluminum heat press mold (FIG. 1) having a clearance (gap, between upper and lower dies of the mold, into which the sheet to be molded is to be inserted) of 2 mm and a radius R of curvature of the lower die of 50 mm. The heat press molding was performed at a temperature of each of the upper and lower dies of 122° C. by a clamping force of 200 kgf for a pressing time of 3 minutes.

Example 9

A resin sheet including the resin layer (A), the resin layer (B) and the hard coat layer (C) stacked sequentially was obtained in substantially the same manner as in example 1.

Heat Pressing Step (Step I)

The obtained resin sheet was put into a shelf dryer set at 120° C. and was pre-heated for 6 minutes. The temperature of the sheet removed from the shelf dryer was 85° C.

(Step II)

10 seconds after being removed from the shelf dryer, the sheet was put into a lower die of an aluminum heat press mold (FIG. 1).

(Step III)

The resin sheet was heat-press-molded in the aluminum heat press mold (FIG. 1) having a clearance (gap, between upper and lower dies of the mold, into which the sheet to be molded is to be inserted) of 2 mm and a radius R of curvature of the lower die of 50 mm. The heat press molding was performed at a temperature of each of the upper and lower dies of 115° C. by a clamping force of 200 kgf for a pressing time of 3 minutes.

Example 10

A resin sheet including the resin layer (A), the resin layer (B) and the hard coat layer (C) stacked sequentially was obtained in substantially the same manner as in example 2.
Heat Pressing Step
(Step I)
The obtained resin sheet was put into a shelf dryer set at 150° C. and was pre-heated for 3 minutes. The temperature of the sheet removed from the shelf dryer was 110° C.
(Step II)
50 seconds after being removed from the shelf dryer, the sheet was put into a lower die of an aluminum heat press mold (FIG. 1).
(Step III)
The resin sheet was heat-press-molded in the aluminum heat press mold (FIG. 1) having a clearance (gap, between upper and lower dies of the mold, into which the sheet to be molded is to be inserted) of 2 mm and a radius R of curvature of the lower die of 50 mm. The heat press molding was performed at a temperature of each of the upper and lower dies of 135° C. by a clamping force of 200 kgf for a pressing time of 3 minutes.

Example 11

A resin sheet including the resin layer (A), the resin layer (B) and the hard coat layer (C) stacked sequentially was obtained in substantially the same manner as in example 1.
Heat Pressing Step
(Step I)
The obtained resin sheet was put into a shelf dryer set at 120° C. and was pre-heated for 6 minutes. The temperature of the sheet removed from the shelf dryer was 85° C.
(Step II)
80 seconds after being removed from the shelf dryer, the sheet was put into a lower die of an aluminum heat press mold (FIG. 1).
(Step III)
The resin sheet was heat-press-molded in the aluminum heat press mold (FIG. 1) having a clearance (gap, between upper and lower dies of the mold, into which the sheet to be molded is to be inserted) of 2 mm and a radius R of curvature of the lower die of 50 mm. The heat press molding was performed at a temperature of each of the upper and lower dies of 122° C. by a clamping force of 200 kgf for a pressing time of 3 minutes.

Example 12

A resin sheet including the resin layer (A), the resin layer (B) and the hard coat layer (C) stacked sequentially was obtained in substantially the same manner as in example 1.
Heat Pressing Step
(Step I)
The obtained resin sheet was put into a shelf dryer set at 120° C. and was pre-heated for 6 minutes. The temperature of the sheet removed from the shelf dryer was 85° C.
(Step II)
10 seconds after being removed from the shelf dryer, the sheet was put into a lower die of an aluminum heat press mold (FIG. 1).
(Step III)
The resin sheet was heat-press-molded in the aluminum heat press mold (FIG. 1) having a clearance (gap, between upper and lower dies of the mold, into which the sheet to be molded is to be inserted) of 2 mm and a radius R of curvature of the lower die of 50 mm. The heat press molding was performed at a temperature of each of the upper and lower dies of 105° C. by a clamping force of 200 kgf for a pressing time of 3 minutes.

Example 13

A resin sheet including the resin layer (A), the resin layer (B) and the hard coat layer (C) stacked sequentially was obtained in substantially the same manner as in example 1.
Heat Pressing Step
(Step I)
The obtained resin sheet was put into a shelf dryer set at 120° C. and was pre-heated for 6 minutes. The temperature of the sheet removed from the shelf dryer was 85° C.
(Step II)
10 seconds after being removed from the shelf dryer, the sheet was put into a lower die of an aluminum heat press mold (FIG. 1).
(Step III)
The resin sheet was heat-press-molded in the aluminum heat press mold (FIG. 1) having a clearance (gap, between upper and lower dies of the mold, into which the sheet to be molded is to be inserted) of 2 mm and a radius R of curvature of the lower die of 50 mm. The heat press molding was performed at a temperature of each of the upper and lower dies of 122° C. by a clamping force of 3000 kgf for a pressing time of 3 minutes.

Comparative Example 1

A resin sheet including the resin layer (A), the resin layer (B) and the hard coat layer (C) stacked sequentially was obtained in substantially the same manner as in example 1.
Heat Pressing Step
(Step I)
The obtained resin sheet was put into a shelf dryer set at 80° C. and was pre-heated for 1 minute. The temperature of the sheet removed from the shelf dryer was 60° C.
(Step II)
10 seconds after being removed from the shelf dryer, the sheet was put into a lower die of an aluminum heat press mold (FIG. 1).
(Step III)
The resin sheet was heat-press-molded in the aluminum heat press mold (FIG. 1) having a clearance (gap, between upper and lower dies of the mold, into which the sheet to be molded is to be inserted) of 2 mm and a radius R of curvature of the lower die of 50 mm. The heat press molding was performed at a temperature of each of the upper and lower dies of 122° C. by a clamping force of 200 kgf for a pressing time of 3 minutes.

Comparative Example 2

A resin sheet including the resin layer (A), the resin layer (B) and the hard coat layer (C) stacked sequentially was obtained in substantially the same manner as in example 1.

Heat Pressing Step
(Step I)
The obtained resin sheet was put into a shelf dryer set at 150° C. and was pre-heated for 10 minutes. The temperature of the sheet removed from the shelf dryer was 130° C.
(Step II)
10 seconds after being removed from the shelf dryer, the polycarbonate with the hard coat was put into a lower die of an aluminum heat press mold (FIG. 1).
(Step III)
The resin sheet was heat-press-molded in the aluminum heat press mold (FIG. 1) having a clearance (gap, between upper and lower dies of the mold, into which the sheet to be molded is to be inserted) of 2 mm and a radius R of curvature of the lower die of 50 mm. The heat press molding was performed at a temperature of each of the upper and lower dies of 122° C. by a clamping force of 200 kgf for a pressing time of 3 minutes.

Comparative Example 3

A resin sheet including the resin layer (A), the resin layer (B) and the hard coat layer (C) stacked sequentially was obtained in substantially the same manner as in example 2.
Heat Pressing Step
(Step I)
The obtained resin sheet was put into a shelf dryer set at 150° C. and was pre-heated for 1 minute. The temperature of the sheet removed from the shelf dryer was 80° C.
(Step II)
50 seconds after being removed from the shelf dryer, the sheet was put into a lower die of an aluminum heat press mold (FIG. 1).
(Step III)
The resin sheet was heat-press-molded in the aluminum heat press mold (FIG. 1) having a clearance (gap, between upper and lower dies of the mold, into which the sheet to be molded is to be inserted) of 2 mm and a radius R of curvature of the lower die of 50 mm. The heat press molding was performed at a temperature of each of the upper and lower dies of 144° C. by a clamping force of 200 kgf for a pressing time of 3 minutes.

Comparative Example 4

A resin sheet including the resin layer (A), the resin layer (B) and the hard coat layer (C) stacked sequentially was obtained in substantially the same manner as in example 1.

Heat Pressing Step
(Step I)
The obtained resin sheet was put into a shelf dryer set at 120° C. and was pre-heated for 6 minutes. The temperature of the sheet removed from the shelf dryer was 85° C.
(Step II)
10 seconds after being removed from the shelf dryer, the sheet was put into a lower die of an aluminum heat press mold (FIG. 1).
(Step III)
The resin sheet was heat-press-molded in the aluminum heat press mold (FIG. 1) having a clearance (gap, between upper and lower dies of the mold, into which the sheet to be molded is to be inserted) of 2 mm and a radius R of curvature of the lower die of 50 mm. The heat press molding was performed at a temperature of each of the upper and lower dies of 130° C. by a clamping force of 200 kgf for a pressing time of 3 minutes.

Comparative Example 5

A resin sheet including the resin layer (A), the resin layer (B) and the hard coat layer (C) stacked sequentially was obtained in substantially the same manner as in example 1.
Heat Pressing Step
(Step I)
The obtained resin sheet was put into a shelf dryer set at 120° C. and was pre-heated for 6 minutes. The temperature of the sheet removed from the shelf dryer was 85° C.
(Step II)
100 seconds after being removed from the shelf dryer, the sheet was put into a lower die of an aluminum heat press mold (FIG. 1).
(Step III)
The resin sheet was heat-press-molded in the aluminum heat press mold (FIG. 1) having a clearance (gap, between upper and lower dies of the mold, into which the sheet to be molded is to be inserted) of 2 mm and a radius R of curvature of the lower die of 50 mm. The heat press molding was performed at a temperature of each of the upper and lower dies of 122° C. by a clamping force of 200 kgf for a pressing time of 3 minutes.

<Evaluation on the Molded Body>
The radius R of curvature of the press-molded body of the resin sheet produced in each of the examples and the comparative examples was measured in order to evaluate the springback. It was visually observed whether the hard coat layer was cracked or not, whether the sheet of the molded body was broken or not, and whether the surface of the molded body was crumpled or not. The results are shown in Table 1 below.

TABLE 1

|  | Resin layer (A) Tg (° C.) | Step (I) Sheet temperature after pre-heating (° C.) | Step (II) Location time (sec.) | Step (III) Mold temperature (° C.) | Step (III) Clamping force (kgf) | Pre-mold resin sheet Pencil hardness | Hard coat Cracked or not | Sheet Broken or not | Molded body Radius R of curvature (mm) | Surface Crumpled or not |
|---|---|---|---|---|---|---|---|---|---|---|
| Ex. 1 | 125 | 80 | 50 | 122 | 200 | 2H | Not cracked | Not broken | 51 | Not crumpled |
| Ex. 2 | 147 | 110 | 50 | 144 | 200 | 3H | Not cracked | Not broken | 51 | Not crumpled |
| Ex. 3 | 125 | 90 | 50 | 122 | 200 | 2H | Not cracked | Not broken | 52 | Not crumpled |
| Ex. 4 | 125 | 80 | 50 | 122 | 1000 | 2H | Not cracked | Not broken | 51 | Not crumpled |
| Ex. 5 | 125 | 85 | 50 | 122 | 1000 | 2H | Not cracked | Not broken | 51 | Not crumpled |
| Ex. 6 | 125 | 85 | 50 | 122 | 1900 | 2H | Not cracked | Not broken | 51 | Not crumpled |
| Ex. 7 | 125 | 85 | 50 | 122 | 100 | 2H | Not cracked | Not broken | 51 | Not crumpled |
| Ex. 8 | 125 | 85 | 10 | 122 | 200 | 2H | Not cracked | Not broken | 51 | Not crumpled |
| Ex. 9 | 125 | 85 | 10 | 115 | 200 | 2H | Not cracked | Not broken | 53 | Not crumpled |

TABLE 1-continued

|  | Resin layer (A) Tg (° C.) | Step (I) Sheet temperature after pre-heating (° C.) | Step (II) Location time (sec.) | Step (III) Mold temperature (° C.) | Step (III) Clamping force (kgf) | Pre-mold resin sheet Pencil hardness | Hard coat Cracked or not | Sheet Broken or not | Molded body Radius R of curvature (mm) | Surface Crumpled or not |
|---|---|---|---|---|---|---|---|---|---|---|
| Ex. 10 | 147 | 110 | 50 | 135 | 200 | 3H | Not cracked | Not broken | 53 | Not crumpled |
| Ex. 11 | 125 | 85 | 80 | 122 | 200 | 2H | Not cracked | Not broken | 58 | Not crumpled |
| Ex. 12 | 125 | 85 | 10 | 105 | 200 | 2H | Not cracked | Not broken | 60 | Not crumpled |
| Ex. 13 | 125 | 85 | 10 | 122 | 3000 | 2H | Not cracked | Not broken | 51 | Crumpled |
| Comparative Ex. 1 | 125 | 60 | 10 | 122 | 200 | 2H | Not cracked | Broken | — | Not crumpled |
| Comparative Ex. 2 | 125 | 130 | 10 | 122 | 200 | 2H | Cracked | Not broken | 51 | Crumpled |
| Comparative Ex. 3 | 147 | 80 | 50 | 144 | 200 | 3H | Not cracked | Broken | — | Not crumpled |
| Comparative Ex. 4 | 125 | 85 | 10 | 130 | 200 | 2H | Cracked | Not broken | 51 | Crumpled |
| Comparative Ex. 5 | 125 | 85 | 100 | 122 | 200 | 2H | Not cracked | Broken | — | Not crumpled |

It is understood that the press-molded body of the resin sheet in each of the examples, in which the pre-heating, the location into the mold, and the clamping were performed under the predetermined conditions of the present invention, had a high hardness and had no abnormality in the external appearance, such as hard coat cracks or the breakage, occurring after being heat-molded. In addition, the press-molded body of the resin sheet obtained in each of the examples showed no flow mark as an abnormality in the external appearance.

Figure 2A:
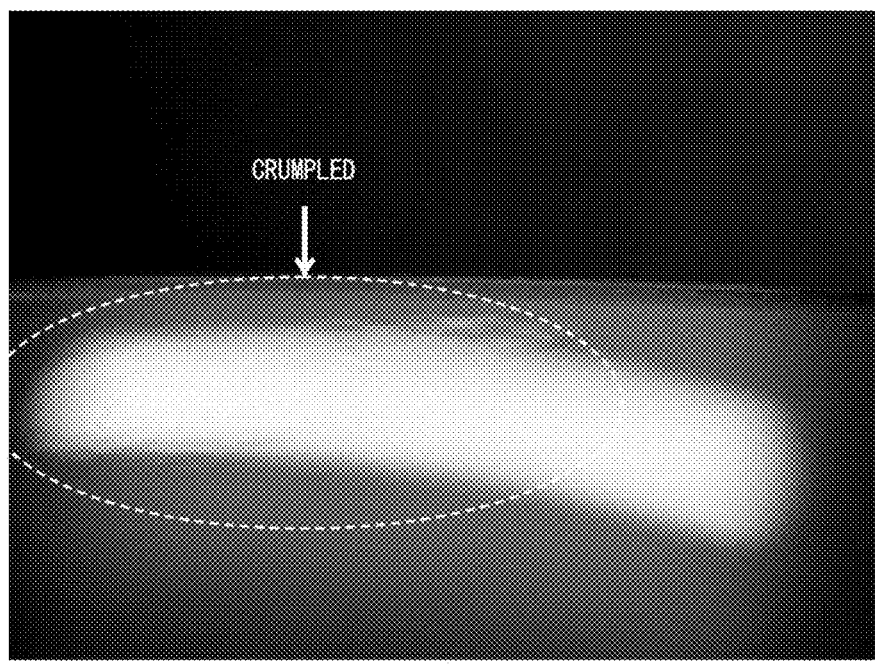
FIG. 2(a) is a photo of a cross-section of a molded body in example 13.
Figure 2B:
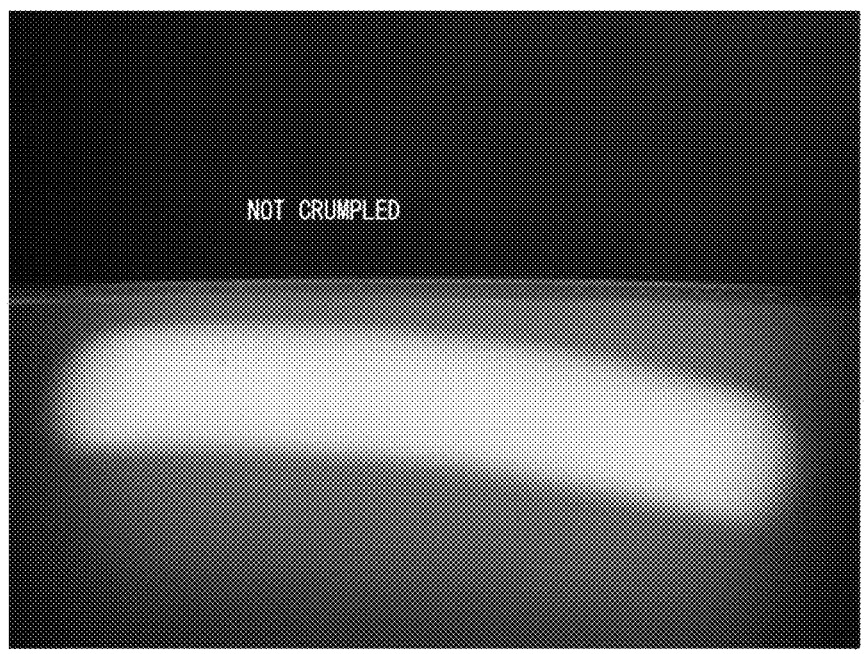
FIG. 2(b) is a photo of a cross-section of a molded body in example 5.

In examples 1 through 12, in which the clamping force on the mold was 2000 kgf or smaller, the surface was not crumpled. FIG. 2(b) is a photo of a cross-section of the molded body in example 5. By contrast, in example 13, in which the clamping force on the mold exceeded 2000 kgf, crumping was observed (FIG. 2(a)).

In example 12, the temperature of the mold at the time of molding was lower than the glass transition point of the resin layer (A)−10° C. In examples 8 and 9, the temperature of the mold at the time of molding was in the range of the glass transition point of the resin layer (A)−10° C. or higher and the glass transition point or lower, and the conditions other than the temperature of the mold were the same as those in example 12. As compared with example 12, in examples 8 and 9, the radius R of curvature of the mold was closer to the radius of curvature of the lower die (50 mm), by which it is confirmed that the generation of the springback was suppressed.

In example 11, the time period after the step (I) was finished until the resin sheet was located into the mold was longer than 60 seconds and 90 seconds or shorter. In example 8, the location time was 60 seconds or shorter, and the conditions other than the location time were the same as those in example 11. As compared with example 11, in example 8, the radius R of curvature of the mold was closer to the radius of curvature of the lower die (50 mm), by which it is confirmed that the generation of the springback was further suppressed.

By contrast, it is confirmed that in the press-molded body in each of the comparative examples, the hard coat layer was cracked and/or the sheet was broken by heat molding.

Specifically, in comparative examples 1 and 3, in which the temperature of the pre-heating was lower than the glass transition point of the resin layer (A)−45° C., the sheet was broken by heat molding.

In comparative example 2, in which the temperature of the pre-heating exceeded the glass transition point of the resin layer (A), the hard coat layer was cracked. In comparative example 4, in which the temperature of the mold at the time of molding exceeded the glass transition point of the resin layer (A), the hard coat layer was cracked by heat molding.

In comparative example 5, in which the time period after the step (I) was finished until the resin sheet was located into the mold exceeded 90 seconds, the sheet was broken.

Some embodiments of the present invention are described above. These embodiments are provided as illustrative examples, and do not intend to limit the scope of the invention. These novel embodiments may be carried out in any of various other forms, and elements may be omitted, replaced or altered in any of various manners without departing from the gist of the invention. These embodiments and modifications thereof are encompassed in the scope or the gist of the invention, and are encompassed in the invention defined by the claims and the equivalent scope thereof. All the documents and publications described in this specification are incorporated herein in the entirety thereof by reference regardless of the purpose thereof. This specification encompasses the claims, and the disclosure of the specification and the drawings, of Patent Application No. 2018-192739 (filed on Oct. 11, 2018), which is the Japanese Patent Application based upon which the present application claims priority.

The invention claimed is:

1. A method for producing a press-molded body of a polycarbonate sheet including a resin layer (A) containing a polycarbonate resin as a main component, and a resin layer (B) containing a high hardness resin (B) as a main component and a hard coat layer (C) sequentially stacked on at least one surface of the resin layer (A), the method comprising:
   pre-heating the polycarbonate sheet to a temperature in the range of a glass transition point of the resin layer (A)−45° C. or higher and the glass transition point or lower;
   locating the pre-heated polycarbonate sheet between an upper die and a lower die of a metal mold, wherein a time period after the pre-heating of the polycarbonate sheet is finished until the polycarbonate sheet is located between the upper die and the lower die of the mold is 90 seconds or shorter; and clamping the mold to press one of the upper die and the lower die to the other of the upper die and the lower die to obtain the press-molded body of the polycarbonate sheet, wherein the mold has a temperature that is the glass transition point of the resin layer (A) or lower.

2. The method according to claim 1, wherein during the locating of the pre-heated polycarbonate sheet, the time period after the pre-heating of the polycarbonate sheet is finished until the polycarbonate sheet is located between the upper die and the lower die of the mold is 60 seconds or shorter.

3. The method according to claim 1, wherein during the clamping of the mold, the mold has a temperature that is in the range of the glass transition point of the resin layer (A)−10° C. or higher and the glass transition point or lower.

4. The method according to claim 1, wherein during the clamping of the mold, the mold is clamped by a clamping force of 2000 kgf or smaller.

5. The method according to claim 1, wherein the polycarbonate sheet has a pencil hardness of 2H or higher.

6. The method according to claim 1, wherein the high hardness resin (B) contains at least one selected from resins (B1) through (B5), wherein:

the resin (B1) is a resin that contains a copolymer containing:
a (meth)acrylic ester structural unit (a) represented by the following general formula (1):

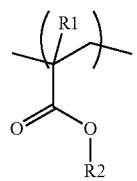
(1)

(in the formula, R1 is a hydrogen atom or a methyl group; and R2 is an alkyl group having a carbon number of 1 to 18 or a cycloalkyl group having a carbon number of 5 to 18 that may be substituted with a hydrocarbon group having a carbon number of 1 to 4), and an aliphatic vinyl structural unit (b) represented by the following general formula (2):

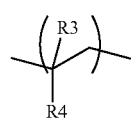
(2)

(in the formula, R3 is a hydrogen atom or a methyl group; and R4 is a cyclohexyl group that may be substituted with a hydrocarbon group having a carbon number of 1 to 4);

the resin (B2) is a resin that contains a copolymer (D) containing 6 to 77% by mass of a (meth)acrylic ester structural unit, 15 to 71% by mass of a styrene structural unit, and 5 to 25% by mass of an unsaturated dicarboxylic acid structural unit;

the resin (B3) is a resin that contains a copolymer containing a structural unit (c) represented by the following general formula (6) and optionally containing a structural unit (d) represented by the following general formula (7);

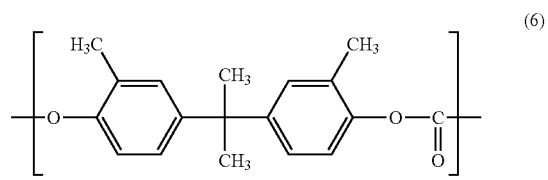
(6)

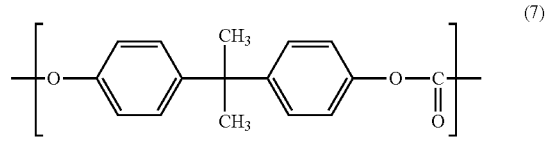
(7)

the resin (B4) is a resin that contains a copolymer (G) containing 5 to 20% by mass of a styrene structural unit, 60 to 90% by mass of a (meth)acrylic ester structural unit, and 5 to 20% by mass of an N-substituted maleimide structural unit; and the resin (B5) is a resin that contains a polymer containing a structural unit (e) represented by the following general formula (8), optionally containing the structural unit (c) represented by the above-identified general formula (6) and optionally containing the structural unit (d) represented by the above-identified general formula (7):

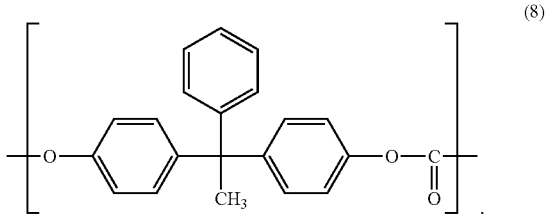
(8)

7. The method according to claim 1, wherein the polycarbonate resin contains a structural unit represented by general formula (7), and

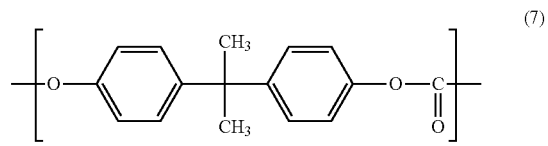
(7)

is produced by use of, as a chain terminator, a monovalent phenol represented by general formula (5):

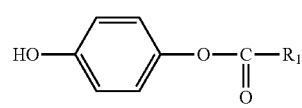
(5)

(in the formula, $R_1$ represents an alkyl group having a carbon number of 8 to 36 or an alkenyl group having a carbon number of 8 to 36).

8. The method according to claim 1, wherein the glass transition point of the resin layer (A) and a glass transition point of the resin layer (B) fulfill the following relationship:

$$-10°\,C \leq (\text{glass transition point of the resin layer }(B)) - (\text{glass transition point of the resin layer }(A)) \leq 40°\,C.$$

9. The method according to claim 1, wherein the press-molded body is a component or a part for use in an automobile, an electric and electronic device, a consumer electronic device or an aircraft.

* * * * *